US007444306B2

(12) United States Patent
Varble

(10) Patent No.: US 7,444,306 B2
(45) Date of Patent: Oct. 28, 2008

(54) METHOD AND APPARATUS FOR THE RENTAL OR SALE, AND SECURE DISTRIBUTION OF DIGITAL CONTENT

(76) Inventor: Thomas Bryan Varble, 19125 NW. 23rd CT, Pembroke Pines, FL (US) 33029

( * ) Notice: Subject to any disclaimer, the term of this patent is extended or adjusted under 35 U.S.C. 154(b) by 741 days.

(21) Appl. No.: 10/971,903

(22) Filed: Oct. 22, 2004

(65) Prior Publication Data

US 2005/0091164 A1    Apr. 28, 2005

Related U.S. Application Data

(60) Provisional application No. 60/514,228, filed on Oct. 24, 2003.

(51) Int. Cl.
*G06Q 99/00* (2006.01)
(52) U.S. Cl. .............................. 705/52; 705/51; 705/64
(58) Field of Classification Search ............. 705/51, 705/59, 52; 726/1–36
See application file for complete search history.

(56) References Cited

U.S. PATENT DOCUMENTS

| 6,055,314 | A | * | 4/2000 | Spies et al. ................. 380/228 |
| 6,609,105 | B2 | * | 8/2003 | Van Zoest et al. ............. 705/14 |
| 7,058,696 | B1 | * | 6/2006 | Phillips et al. ............... 709/217 |
| 2006/0218651 | A1 | * | 9/2006 | Ginter et al. ................. 726/27 |

* cited by examiner

*Primary Examiner*—Andrew J. Fischer
*Assistant Examiner*—Chrystina Zelaskiewicz

(57) ABSTRACT

An apparatus for the rental or sale, and distribution of digital content via the Internet. This apparatus ensures enforcement of copyrights and end-use licensing. The invention consists of one or more databases, for the storage of digital content, and also for storage of customer profile and billing information. These databases are housed in multiple networked computers, sharing a private connection to an Internet firewall, gateway computer. This computer hosts an electronic commerce web site for customer purchase transactions and encryption of digital content prior to customer download. The invention also includes a software client application for decrypting and using the digital content. The invention also provides for computer software to manage the digital content inventory of each customer.

63 Claims, 11 Drawing Sheets

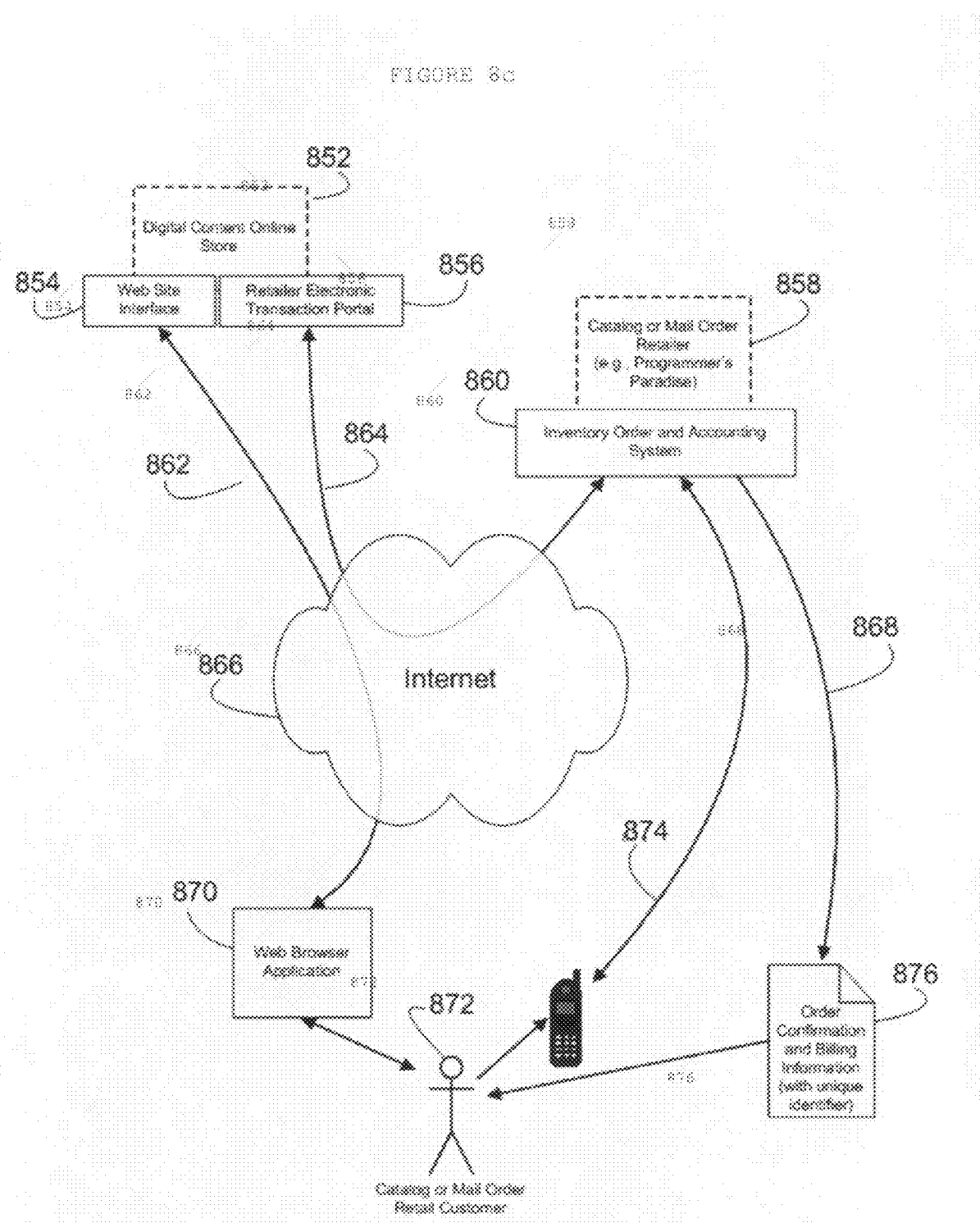

METHOD AND APPARATUS FOR THE RENTAL OR SALE, AND SECURE DISTRIBUTION OF DIGITAL CONTENT

RELATED APPLICATIONS

The present application is a continuation application of U.S. provisional patent application Ser. No. 60/514,228, filed Oct. 24, 2003, for A METHOD AND APPARATUS FOR THE RENTAL OR SALE, AND DISTRIBUTION OF DIGITAL CONTENT VIA AN ONLINE INTERNET STORE, by T. Bryan Varble, included by reference herein and for which benefit of the priority date is hereby claimed.

The present application is related to U.S. Pat. No. 6,055,314, issued Apr. 25, 2000, for SYSTEM AND METHOD FOR SECURE PURCHASE AND DELIVERY OF VIDEO CONTENT PROGRAMS, by Terence R. Spies, Daniel R. Simon, included by reference herein.

The present application is related to U.S. Pat. No. 6,609,105, issued Aug. 19, 2003, for SYSTEM AND METHOD FOR PROVIDING ACCESS TO ELECTRONIC WORKS, by Alexander T. Van Zoest, Matthew John Dimeo, Brian Mason Degenhardt, Charles Lawerence Sismondo, Brian Callahan, John William DeRose, George Matthew Costello, Tristan Anne Barnum, James Park, Joshua Stephens, Michael Oliphant, David M. Story, John P. Knott, James Martin Moore, included by reference herein.

FIELD OF THE INVENTION the present invention relates to an apparatus and, more particularly, to a set of online business transactions and supporting software and hardware applications to purchase or rent digital content, as well as manage, download, and use that content.

BACKGROUND OF THE INVENTION

Currently, no one has solved the problem how to "own" digital content. That is, once some intellectual property like music or video is digitized; it may be reproduced without degradation many times over. In essence, the problem is applying those qualities of "tangible ownership" to digital works: universal uniqueness; universal identity; uniqueness of instance; transferability of control.

Current existing mechanisms and methods for digital content purchasing or renting can be broken into two main categories: streaming distributions that require the end-user to maintain a live network connection, or those that link content to non-securable digital distribution media. Examples of the former include the Cable and Wireless, Inc., and Real Networks, Inc. Examples of the latter include: Compact Disc [CD] and Digital Versatile Disc [DVD]. Both of these storage media formats are decodable and reproducible using publicly-available products.

In the first existing category, the digital content is "streamed." For example, the Microsoft content store U.S. Pat. No. 6,055,314, is a streaming distribution model using a local hardware device for customer authentication. Here, streaming refers to serialized bit streams transmitted across a digital carrier [network]. These streams are then decoded and presented in human-consumable format to a video display or an audio player. This model is very similar to broadcast TV or Radio in that the data stream is ephemeral—once it is played it is gone. This method is most similar to Video-on-Demand (VOD) services. An alternative variation of this model is the MovieLink, Inc. stream and buffer approach. Here, the content is streamed, but also stored locally on a computer hard drive.

The second existing, and more prevalent distribution category, is via digital storage media (e.g., DVD, Music CD, etc.). In this model, the consumer owns or rents the digital storage media containing the desired digital content. So, rather than an ephemeral stream that is experienced on a per-use basis; the consumer may access the content in whatever order or schedule they wish. An alternative variation to this model is the MP3.com content store U.S. Pat. No. 6,609,105. In this invention, the content is stored in a central repository, but requires a customer to possess the original digital media in order to access the digital content.

The drawbacks of the "streamed" model of digital content distribution are:

Once the digital content play has started, it is difficult and unwieldy to stop and start again.

The customer is tied to the broadband distribution network. This prevents a streaming solution from being easily portable.

This method is susceptible to network congestion and interruption, which dramatically degrade the quality of playback. Though broadband networks are widely available, network traffic slowdowns and burstiness are notorious problems.

There is no concept of ownership with this model. The content is purchased on a per-use basis.

This model is inappropriate for non-video or non-music content. For example, software application content can not be streamed. By its very nature, it must be present within a computer's memory and available in its totality.

The disadvantages to the MovieLink.com "stream and buffer" distribution model are:

This is a video-only solution.

This is a rental-only model. There is no provision for enforcement of ownership.

This model allows the content to be available in raw digital form, making it susceptible to unauthorized distribution This model provides no support for rich content upgrades, for example HDTV-format video.

The drawbacks of digital storage media distribution are:

Distributable media solutions have proven insecure and easy to pirate and duplicate.

As content reproduction technology advances, customers must re-equip their consumer electronics. Also, standing inventories will be made obsolete and un-sellable.

If the physical media is damaged, access to the content is lost and the content and distribution media must be re-purchased.

The disadvantages of the MP3.com central repository requiring the original digital media are:

This content in this model is not uniquely encrypted and is subject to unlawful distribution.

This model allows the content to be available in raw digital form, making it susceptible to unauthorized distribution This model provides no support for rich content upgrades, for example DVDA-format high-fidelity audio.

It is therefore an object of the invention to provide a means and supporting apparatus to define and manage the actual "ownership" of digital content It is another object of the invention to support a set of business methods to enable online and retail-based transactions for the sale and rental of digital content It is another object of the invention to provide a means and apparatus for alternative embodiments of digital content purchase and rental transaction models to support third-party and wholesale business models It is another object of the invention to provide a means and apparatus for management of owned or rented digital content to improve the customer experience through ease of use and enhanced inventory access and control

SUMMARY OF THE INVENTION

In accordance with the present invention, there is provided an apparatus for the rental or sale, and distribution of digital content via the Internet or other data communication network. This apparatus supports enforcement of copyrights and end-use licensing. The invention consists of one or more large databases, for the storage of digital content, and also for storage of customer profile and billing information. These databases are housed in a plurality of networked computers. These computers share a private connection to an Internet firewall, gateway computer. This computer hosts an electronic commerce web site for customer purchase transactions. This plurality of computers also supplies a means for unique encrypting of digital content prior to customer download. The invention also includes a downloadable software client application for decrypting and using the digital content. The invention also provides for computer software to manage the digital content inventory of each customer. This inventory management includes, but is not limited to, allowing the customer to check-in and check-out the digital content they have purchased or rented. This capability allows for content portability and a plurality of customer playback devices.

BRIEF DESCRIPTION OF THE DRAWINGS

A complete understanding of the present invention may be obtained by reference to the accompanying drawings, when considered in conjunction with the subsequent, detailed description, in which:

FIG. 8c is an use-case diagram view of an embodiment of the invention's supported business method to support wholesale of digital content through a traditional catalog or mail order retailer.

For purposes of clarity and brevity, like elements and components will bear the same designations and numbering throughout the FIGURES.

DESCRIPTION OF THE PREFERRED EMBODIMENT

Figure 1:
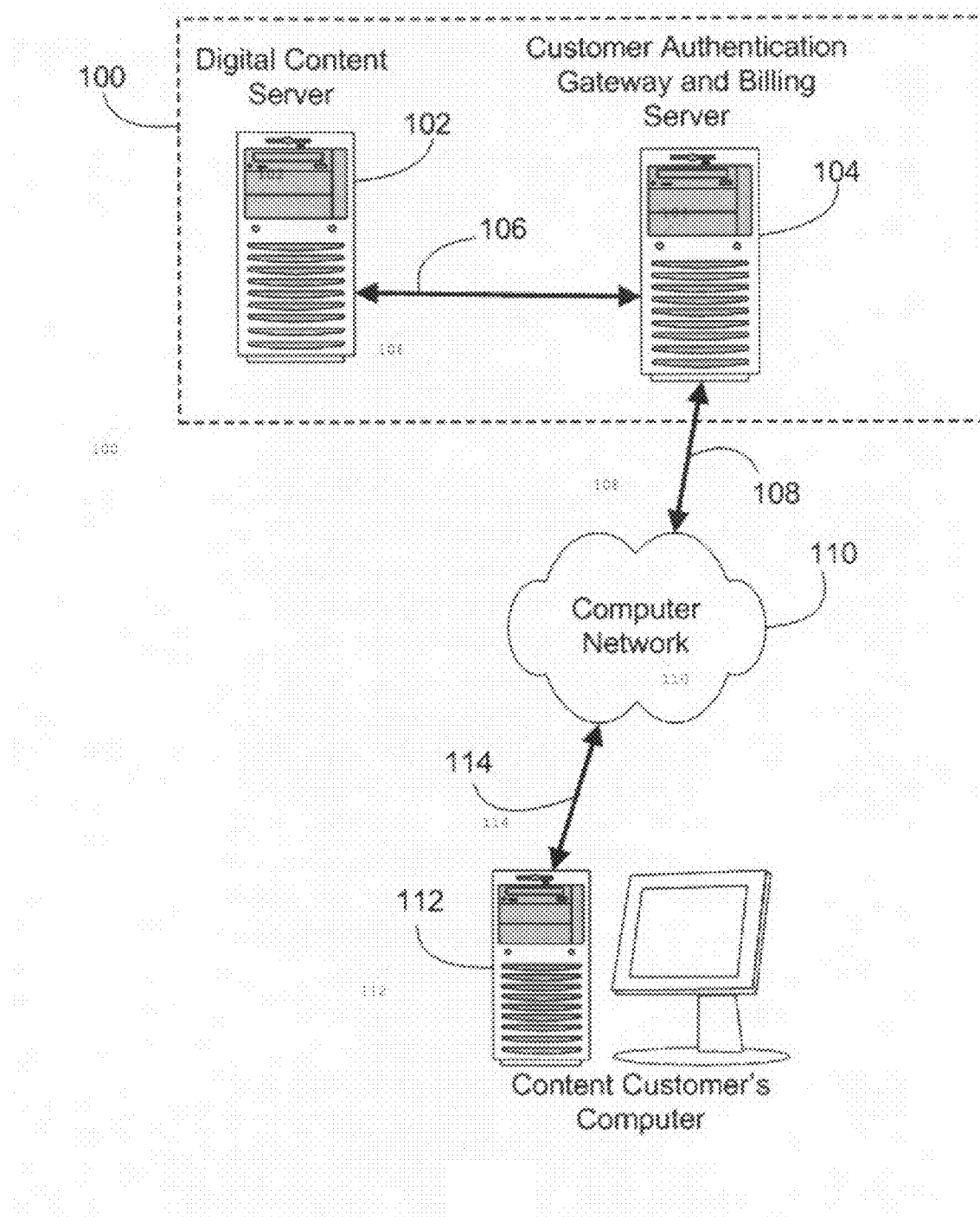
FIG. 1 is a hardware architecture view of a basic hardware architecture of the invention apparatus. It includes one or more computers housing the software applications comprising a digital content online store.

FIG. 1 is a hardware architecture view of the invention apparatus. A digital content online store [hardware] 100, contains a plurality of computers divided between a database server 102 role, and customer gateway server 104 role. Theses computers are linked by a high-capacity private network 106. Isolation of the database server 102 prevents external access to the master digital content. The gateway server 104 is linked to the Internet public computer network 110, by a high-capacity link 108. Software applications executed by said plurality of computers in the digital content online store [hardware] 100, implement the digital content online store [software] 200. A customer connects to the digital online content store via an Internet, or private data network access link 114. This link allows online connections and transactions between the customer device 112 and the online store.

Figure 2:
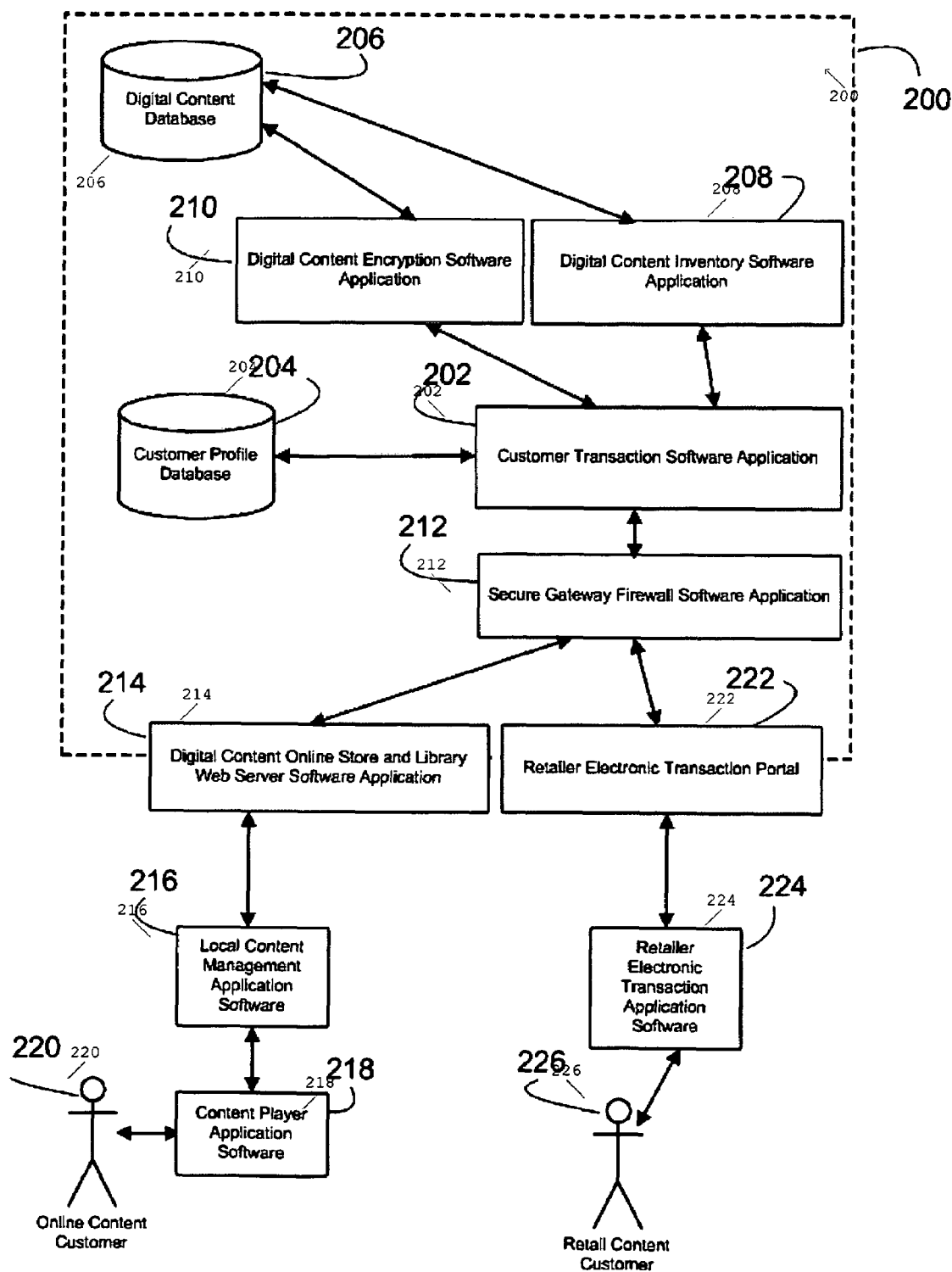
FIG. 2 is a software architecture view of a basic software architecture of the invention apparatus. It includes a plurality of software applications used to implement the functionality of a digital content online store.

FIG. 2 is a software architecture view of the invention apparatus. A digital content online store [software] 200 contains a plurality of software applications to embody the functions of an online storefront. Together, these applications perform all functions necessary for secure, online customer business transaction processing.

Individually, these applications provide:

A customer transaction software application 202. This application provides all basic aspects typical of electronic commerce. This includes, but is not limited to:

Credit card authorization and debit

Customer purchase tracking and billing

Customer inventory management for owned or leased content

Creation, updating, and deletion of customer information profiles and records

Auditing of system status and database contents

Execution of customer search and retrieval requests

Execution of customer library check-in's and check-out's

Execution of retail electronic transactions.

A customer database 204, housing all of the customer specific information for billing, purchasing, and inventory tracking.

A digital content database 206, housing all of the available content for the store.

A digital content inventory application 208. This application supplies the customer with the ability to organize, search, and group the available content into logical, human review-able groupings.

A digital encryption application 210. This application provides per-customer content encryption for the prevention of unauthorized content distribution.

A secure firewall and gateway application 212 through which the customer interface and the retail data portal must communicate with the online content store. This application protects the content store from malicious electronic intrusion.

An online customer web interface application 214 for using the services of the content store.

An online retail transaction portal 222 interface for retail store electronic transactions.

The invention also includes a software application that runs on any device on which the online digital content customer 220, may play content. This local content management application 216 will decrypt and interact with a content experience application 218, whether the content is a:

Game program executing on a computer or dedicated game console

Music content executing on a computer or a dedicated music player

Video content executing on a computer or a dedicated video player

This content management application 216, residing local to the content customer; allows the player and its digital content to be portable, and not tied to an online network connection.

The invention also contains the retailer transaction application 224 to interact with standardized retail electronic systems, via the aforementioned retail transaction portal 222. This interface allows a retail digital content customer 226 to purchase or rent content from traditional retail outlets.

The operation of the invention centers on a unique business method and the invention's apparatus to purchase or rent digital content. The unique feature of the invention is that it separates the purchase, rental, and inventory management of digital usage rights from the actual use of the respective digital content. This separation breaks the operation of the invention into two components:

Digital content purchase or rental;

Digital content download and use.

Architecturally, this simplifies implementation of the invention by separating the apparatus for digital content rights acquisition from the content distribution apparatus. For the acquisition of digital content licensing, the invention supports, but is not limited to, three business methods:

A digital content license may be purchased or rented via an online electronic commerce web site transaction;

A digital content license may be purchased via a traditional retail store electronic business transaction;

A digital content license may be rented via a traditional retail store electronic business transaction.

The invention supports these methods by supplying a transaction interface apparatus for online, 214, and offline retail transactions, 222, respectively.

Figure 3:
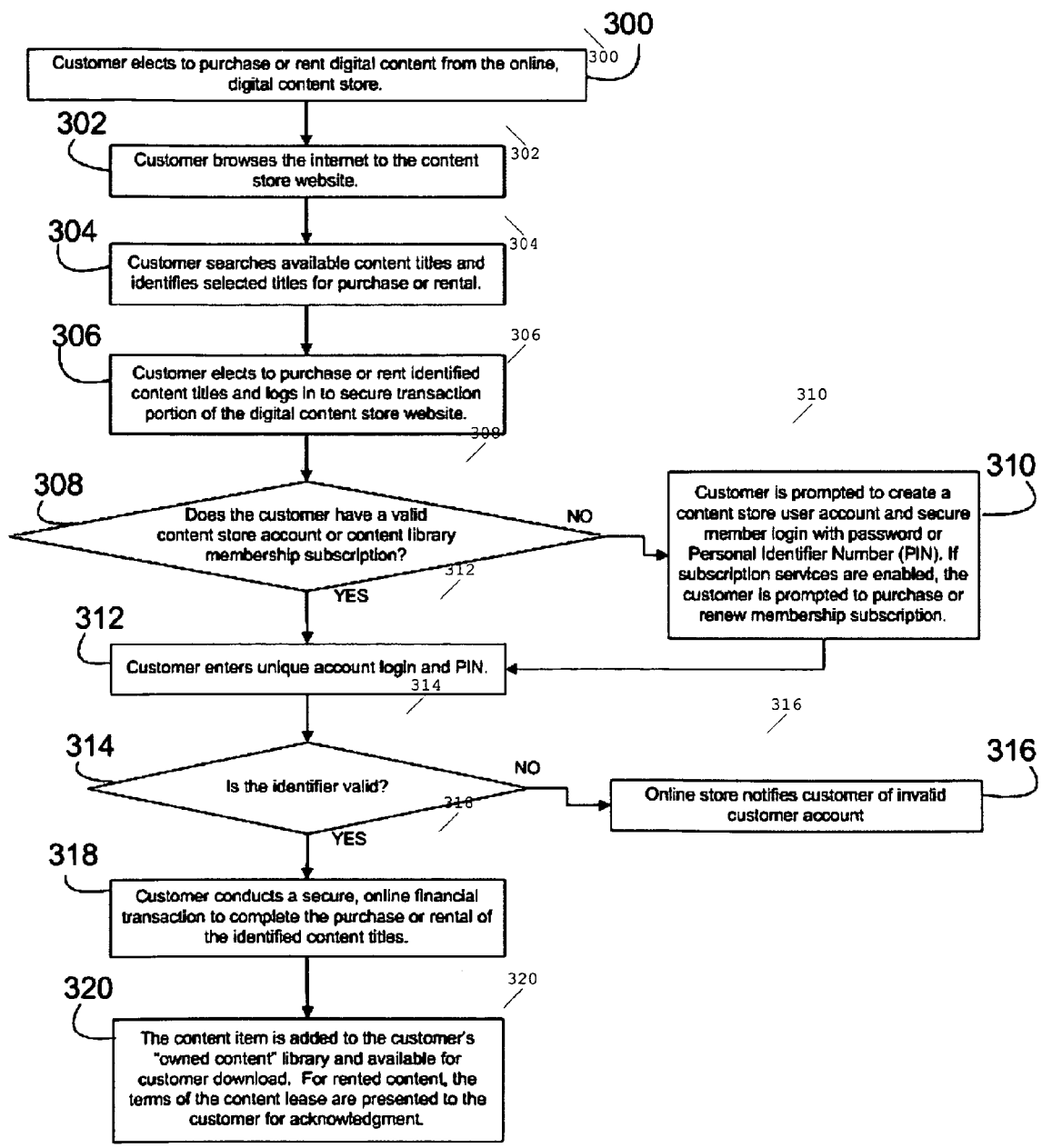
FIG. 3 is a process flow view of a basic transaction process for online purchasing, and renting of digital content using this invention.

FIG. 3 is a process flow view of the basic business method process flowchart for online purchasing, and renting of digital content using this invention. Here, the process starts with a customer shopping step 300. An online customer proceeds through a select store step 302 to review the available content in the online store. This browsing step 304 allows the customer to identify digital content for rental or purchase. Once selection is complete, the customer logs into a secure transaction via the customer authentication step 306. At this point in the process, the customer's identity will be validated in the membership step 308. Here, if the customer is not a member of the online store, he or she will be prompted to create a log-in account with a password or personal identification number (PIN). An alternative embodiment of this new account step 310 is to use a subscription-based membership model. In such a model, the customer would be prompted to create or renew an online store membership.

Once membership is established, the customer is prompted to the log-in step 312. Here, the customer supplies a unique customer identifier, their log-in; and a unique security identifier, their PIN or password. The next validation step 314 allows the online store to check the authenticity of the log-in/password tuple. If the log-in should prove invalid, the customer will be notified in the log-in failure step 316. Otherwise, the transaction process will proceed to the purchase step 318. Here, the customer conducts a traditional online business transaction to purchase or rent their selected digital content (from the browsing step 304).

Finally, in the library addition step 320, the purchased or rented content is added to the customer's online content store library. Here, the library is a logical construct for managing a customer's inventory of digital content titles. Once this step is complete, the purchase or rental business process is complete.

Figure 4:
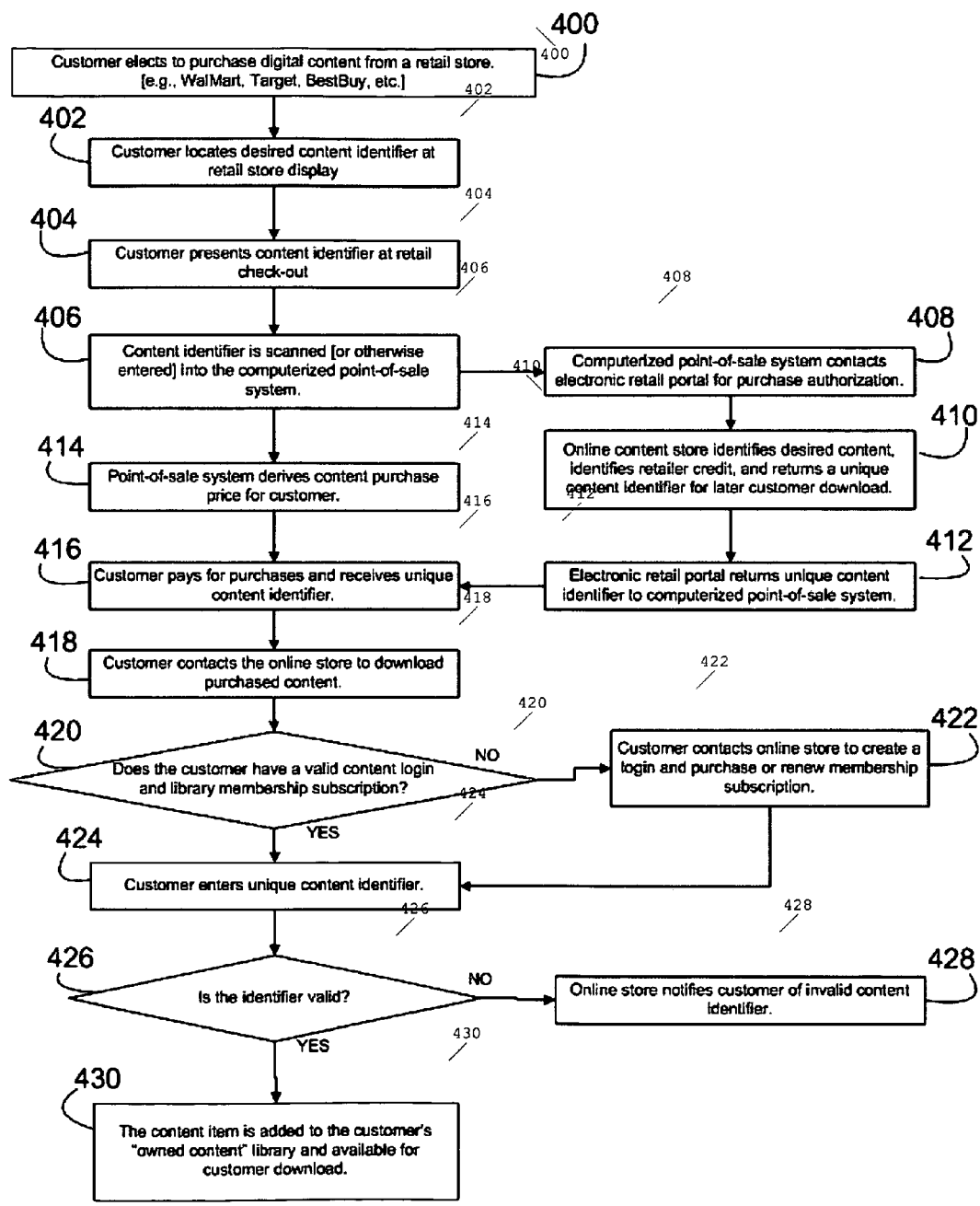
FIG. 4 is a process flow view of a basic transaction process for retail purchasing of digital content using this invention.

FIG. 4 is a process flow view of the basic business method process flowchart for retail purchasing of digital content using this invention. Here the process starts with a customer retail purchase shopping step 400. Next, the customer proceeds to a purchase content selection step 402. In the ideal embodiment, this would be implemented using a machine and human readable content identifier; specifically a card-stock or plastic card with title, universal product code (UPC), and marketing images. Once identified and selected, the customer would present this content product identifier during the retail purchase check-out step 404. At check-out, the purchase identifier entry step 406, the content identifier is entered into the retailer's point-of-sale system (POS). The POS then contacts the online content store retail transaction portal 222 as part of the purchase authorization step 408.

Here the online content store performs the retail purchase transaction step 410. In this step, the online content store identifies the selected content title, validates the retailer's account information (e.g., credit and purchase accounts receivables), and generates a unique customer content identifier for return to the customer via the POS. This is the purchase transaction response step 412. The customer receives this unique content identifier upon completion of their purchase transaction. As part of that transaction, the retail inventory system supplies an item price to the POS via the content purchase price step 414. Once the sale transaction is completed, the content purchase step 416 is finished and the customer leaves the retailer with a content title unique identifier.

At his or her convenience, the customer may then login to the online content store to add the purchase to their content library in the contact store purchase step 418. Here, the online content store performs customer identity validation in the retail purchase authentication step 420; checking the customer's identity and security identifier. As in 308, if the customer is not a current valid member, he or she is prompted to create or renew a log-in or subscription in the retail purchase membership step 422. Once, the customer is logged into the online content store, he or she may enter the unique identifier of the content for the purchase identifier selection step 424.

At this point in the process, the online content store performs a purchase identifier validation step 426 to confirm the identifier and its use rights authorization. In the event that the identifier is not valid, the purchase identifier rejection step 428 will notify the customer of the invalidation. The online content store will also log the validation failure for notification of the retailer as well as audit purposes. Finally, once validated, the customer proceeds to the retail purchase library step 430. At this point, the customer now owns the content and is free to check it out for download to a local device. This is the last step in the retail purchase business process.

Figure 5:
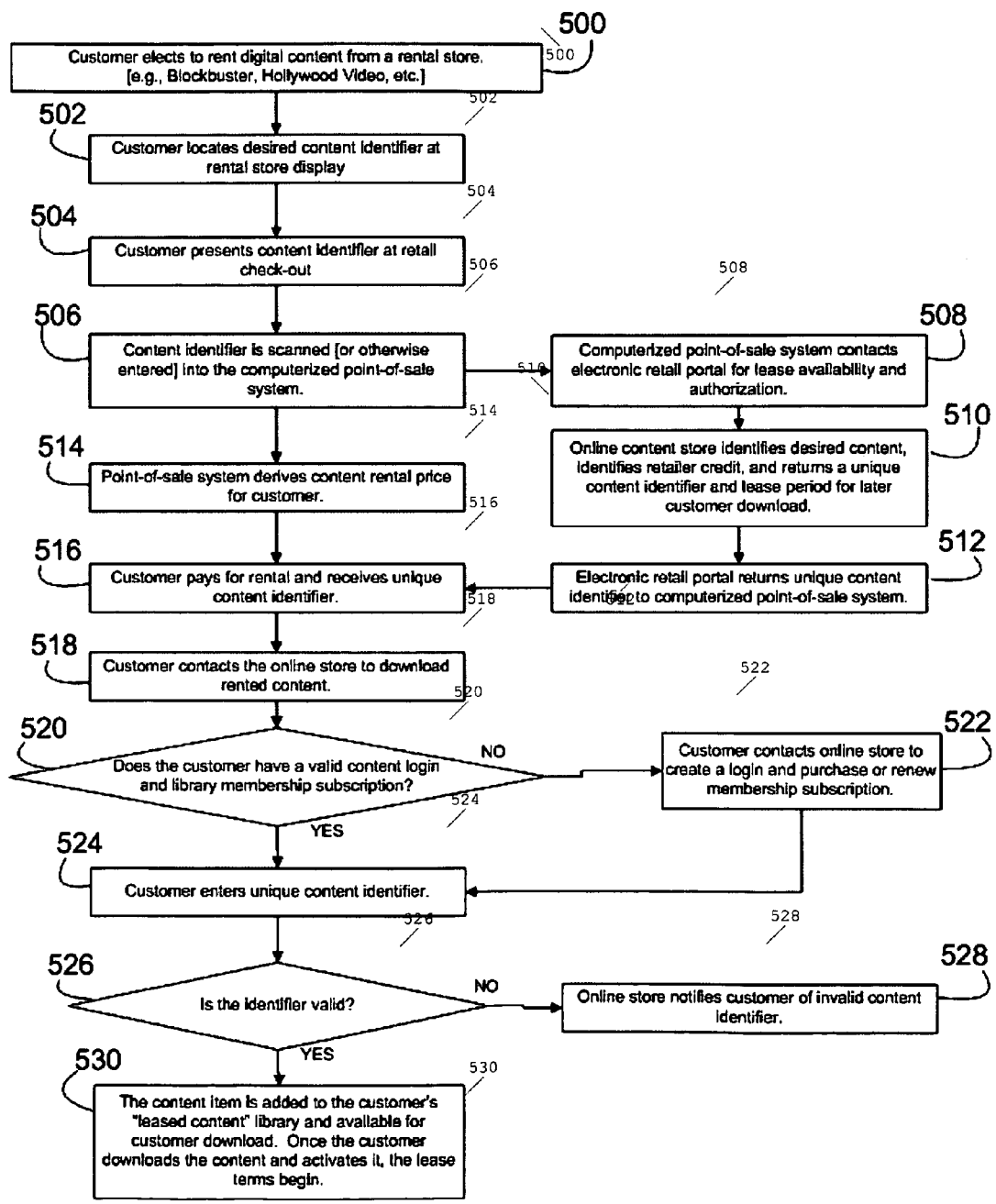
FIG. 5 is a process flow view of a basic transaction process for retail rental of digital content using this invention.

FIG. 5 is a process flow view of the basic business method process flowchart for retail rental of digital content using this invention. Here the process starts with a customer retail rental shopping step 500. Next, the customer proceeds to a rental content selection step 502. In the ideal embodiment, this would be implemented using a machine and human readable content identifier; specifically a card-stock or plastic card with title, universal product code (UPC), and marketing images. Once identified and selected, the customer would present this content product identifier during retail rental check-out step 504. At check-out, the rental identifier entry step 506, the content identifier is entered into the retailer's point-of-sale system (POS). The POS then contacts the online content store retail transaction portal 222 as part of the rental authorization step 508.

Here the online content store performs the retail rental transaction step 510. In this step, the online content store identifies the selected content title, validates the retailer's account information (e.g., credit and rental accounts receivables), and generates a unique customer content identifier for return to the customer via the POS. This is the rental transaction response step 512. The customer receives this unique content identifier upon completion of their rental transaction. As part of that transaction, the retail inventory system supplies an item price to the POS via the content rental price step 514. Once the sale transaction is completed, the content rental step 516 is finished and the customer leaves the retailer with a content title unique identifier.

At his or her convenience, the customer may then login to the online content store to add the rental to their content library in the contact store rental step 518. Here, the online content store performs customer identity validation in the retail rental authentication step 520; checking the customer's identity and security identifier. As in 308, if the customer is not a current valid member, he or she is prompted to create or renew a log-in or subscription in the retail rental membership step 522. Once, the customer is logged into the online content store, he or she may enter the unique identifier of the content for the rental identifier selection step 524.

At this point in the process, the online content store performs a rental identifier validation step 526 to confirm the identifier and its use rights authorization. In the event that the identifier is not valid, the rental identifier rejection step 528 will notify the customer of the invalidation. The online content store will also log the validation failure for notification of the retailer as well as audit purposes. Finally, once validated, the customer proceeds to the retail rental library step 530. At this point, the customer now owns a rental lease of the content and is free to check it out for download to a local device. This rental lease is specific to the particular terms and conditions of the renting party. This is the last step in the retail rental business process.

Figure 6:
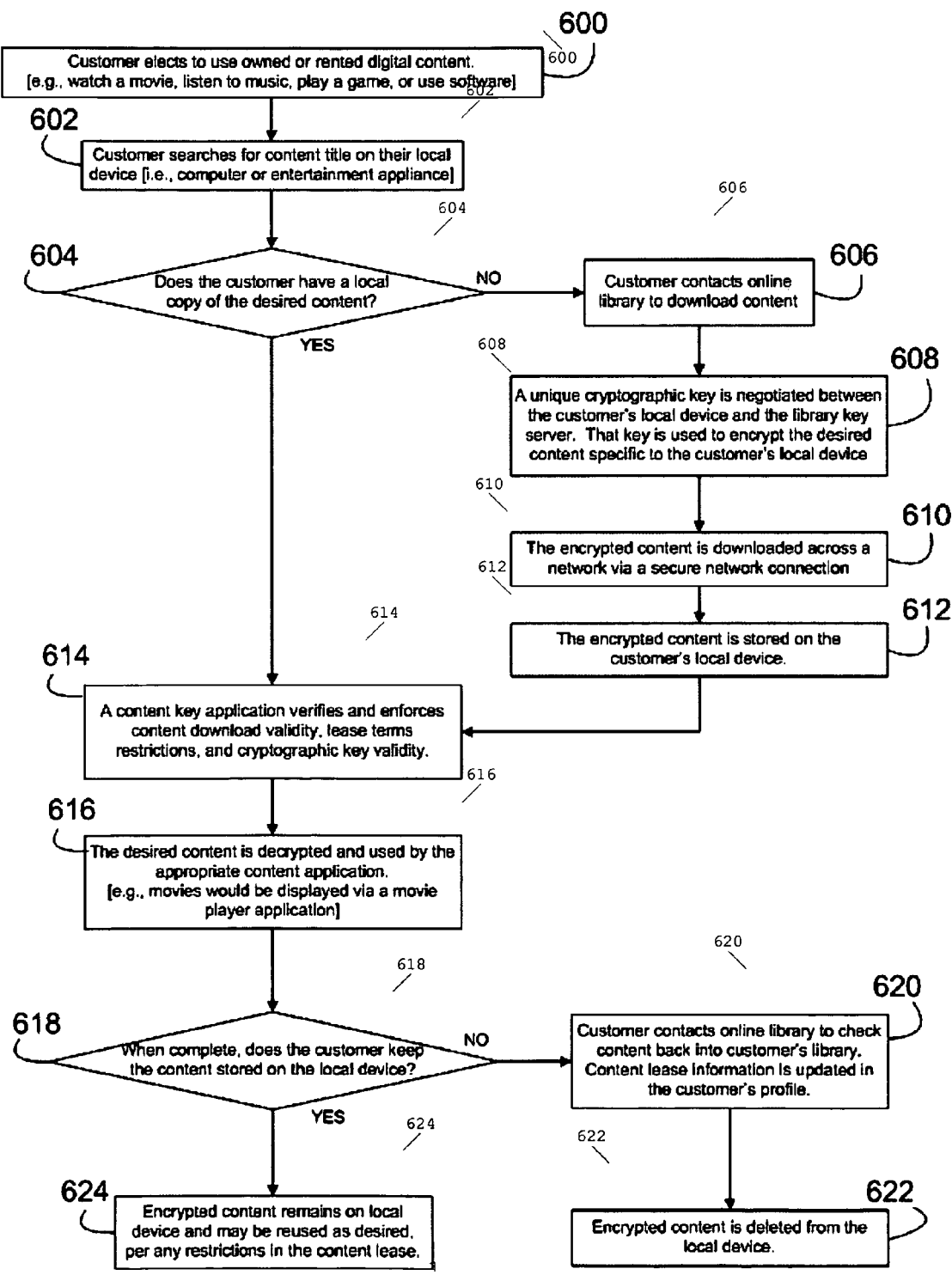
FIG. 6 is a process flow view of a basic transaction process for checking out, checking in, and downloading digital content from the content library in this invention.

FIG. 6 is a process flow view of the basic business method process flowchart for checking out, checking in, and downloading digital content from the invention's content library. Here the content use step 600 is the starting point for this process. Once a customer has elected to experience digital content from his or her library, he or she proceeds to the content search step 602. At this point, the customer searches for the desired title on their local device. The content localizer step 604 is the decision point for the content search. If the desired content is not on the local device, the customer proceeds to the download request step 606. Here the customer must go online to contact the online content store customer database 204 to access their library.

Once the content is located in the customer library, the download request moves to the key generation step 608. Here, a series of operations are performed. Although there are numerous effective methods to accomplish these steps, the ideal embodiment will follow this process:

The local content management application 216 supplies a unique local device identifier to the online content store encryption application 210. This identifier should be based on a hardware serial number (e.g., a hard disk serial number);

The encryption application 210 uses this identifier, combined with the customer identifier and security identifier to generate an encryption key;

This key is then used to encrypt the desired digital content;

The encryption may be any standard algorithm previously agreed between the encryption application 210 and the local content management application 216, (i.e., Advanced Encryption Standard [AES], Data Encryption Standard [DES], Rivest, Shamir, and Aldeman standard [RSA], etc.);

The result is digital content that is uniquely encrypted for each local device. Further, should the content be released into the open; it could not be decoded without BOTH the local device serial number and the customer identifier and security identifier.

The next point is the download step 610. Here the online content store establishes a secure network connection (using a mechanism like the Secure Sockets Layer [SSL]). Once established, the encrypted content is downloaded to the customer's local device. This device can be any physical consumer of digital content (i.e., a personal computer, a home entertainment gateway, a cable data storage-enabled set-top box, a satellite storage-enabled set-top box, a streaming storage entertainment console [like TiVo], a portable storage-enabled media player [like ipod], a personal digital assistant [PDA], a storage enabled cell phone or wireless data handset, etc.). Once downloaded, the content is stored on the local device in the local storage step 612.

Once the content is on the local device, the content validity step 614 is entered to verify usage rights and authorizations on the local device. This task is performed by the local content management application 216. This application validates the encryption keys, the terms and conditions if the content is rented, and any usage restrictions that my be linked to the content. If the rental period has expired or the content is restricted in some way, the application may delete the content or prevent decryption of the content.

If the usage rights and key validity are in proper order, the content experience step 616 is performed to decrypt and play the content through the appropriate media player. For example, if it is a video or audio file; it might be streamed to Microsoft Media Player. An image file might be fed to a jpg viewer, while a document file might be fed to Adobe Acrobat Reader. Depending upon the content and the user's configuration, the content will be presented to the appropriate application for the optimum customer experience.

Once the customer has experienced the content, he or she enters the local content storage step 618. Here they must decide if they want to keep the content on the local device or check it back into the online library. This is not necessarily a discrete choice; the local content management application 216 may default to one behavior or the other depending upon configuration or implementation.

If the customer chooses the content check-in step 620, the online content store library is contacted and updated with the "check-in." This marks the content title as available for download. At the same time, the local content is deleted from the local device. The purpose of this model is to enforce the "uniqueness of existence" quality of possession. That is, a person who buys (or rents) one copy of a content title may only use that content on one [and only one] device at any given time. This is the checked-in content deletion step 622.

If the customer chooses to keep the content title checked-out, the encrypted local content is left in storage on the local device. Due to the device specific encryption used, if the content is copied to another device; it will be indecipherable and unusable. This final step in the download and experience business process is the local content step 624.

Figure 7A:
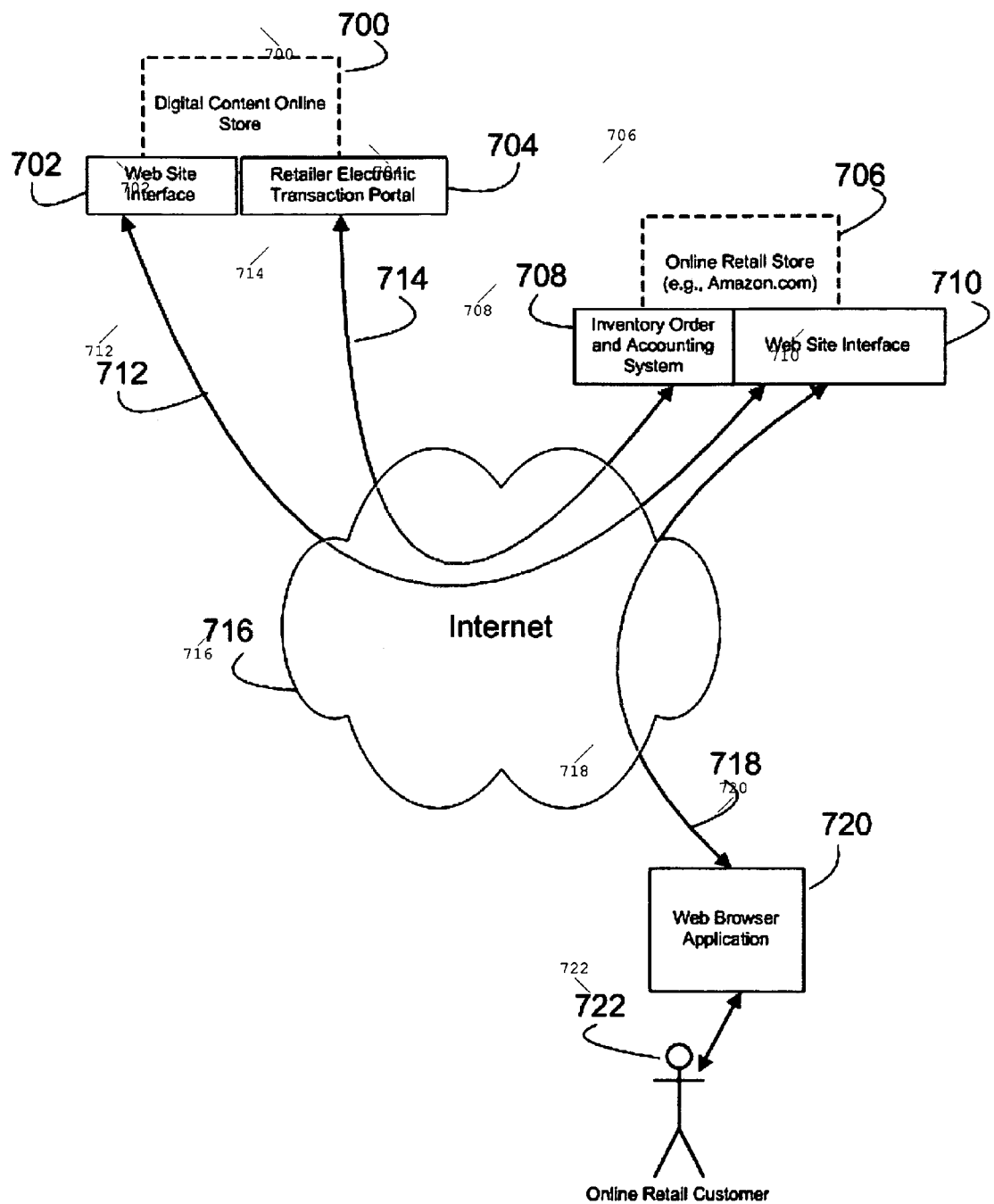
FIG. 7a is an use-case diagram view of an embodiment of the invention's supported business method to support the wholesale of digital content through another online store.

FIG. 7a is an use-case diagram view of a variation of the invention's supported business method to support the wholesale of digital content through another online store. Here, the customer does not interact with the digital content online store directly, but rather with a wholesale content store 700 via some other online retail storefront 706 like Amazon.com or Walmart.com. In this alternative embodiment, the online wholesale customer 722 using their wholesale customer web browser 720 interacts with the online retail storefront 706 directly via a retail storefront customer connection 718. In turn, that storefront embeds the wholesale web site 702 within it's own online retail web site 710 via the online stores web site connection 712. In this way, the customer is able to make use of the digital content store features across the wholesale Internet network 716 from within their preferred online retailer's site. Likewise, by wholesaling the features of the online content store; the online retailer need not "re-invent the wheel."

When the customer makes content purchases, these are processed by the online retail storefront 706. Then, the storefront's online retail store inventory system 708 conducts a retail electronic business transaction (EBT) with the wholesale transaction portal 704 via the online stores electronic portal connection 714

Figure 7B:
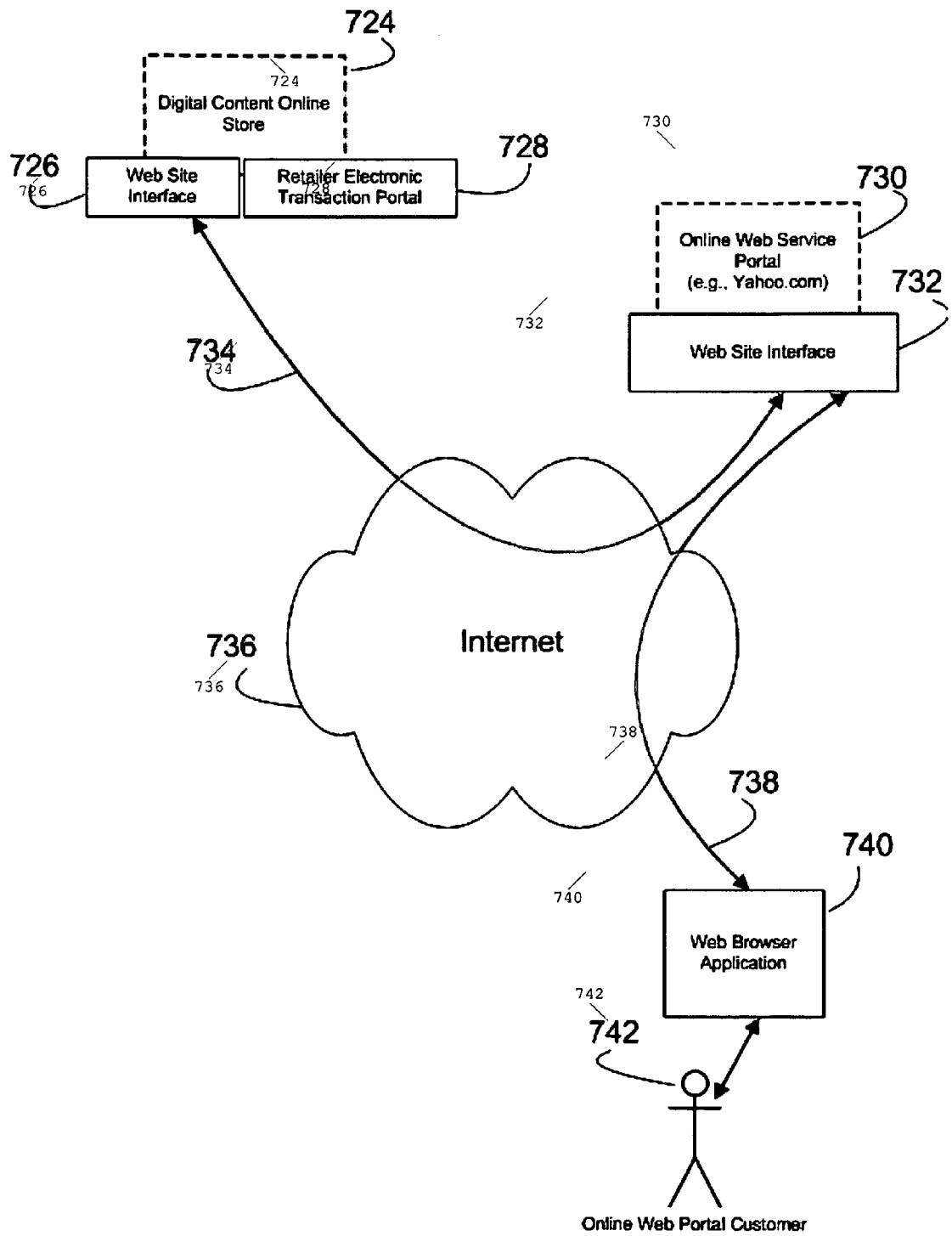
FIG. 7b is an use-case diagram view of an embodiment of the invention's supported business method to support the wholesale of online content store services through a web portal provider.

FIG. 7b is an use-case diagram view of a variation of the invention's supported business method to support the wholesale of online content store service through a web portal provider. Here, the customer does not interact with the digital content online store directly, but rather with a portal content store 724 via some other online service portal 730 like Yahoo.com or MSN.com. In this alternative embodiment, the online portal customer 742 using their portal customer web browser 740 interacts with the service portal web site 732 directly via a portal service customer connection 738. In turn, that service portal redirects the web site interaction to the portal web site 726 via the online portal store connection 734. In this way, the customer is able to make use of the digital portal content store 724 features across the portal Internet network 736 from within their preferred web portal's site. Likewise, by wholesaling the features of the online content store; the online portal need not host their own online store.

When the customer makes content purchases, these are processed by the portal content store 724 via the portal web site 726. In this embodiment, the portal transaction portal 728 does not conduct a retail electronic business transaction (EBT). The entire transaction is handled through the online web interface.

Figure 8A:
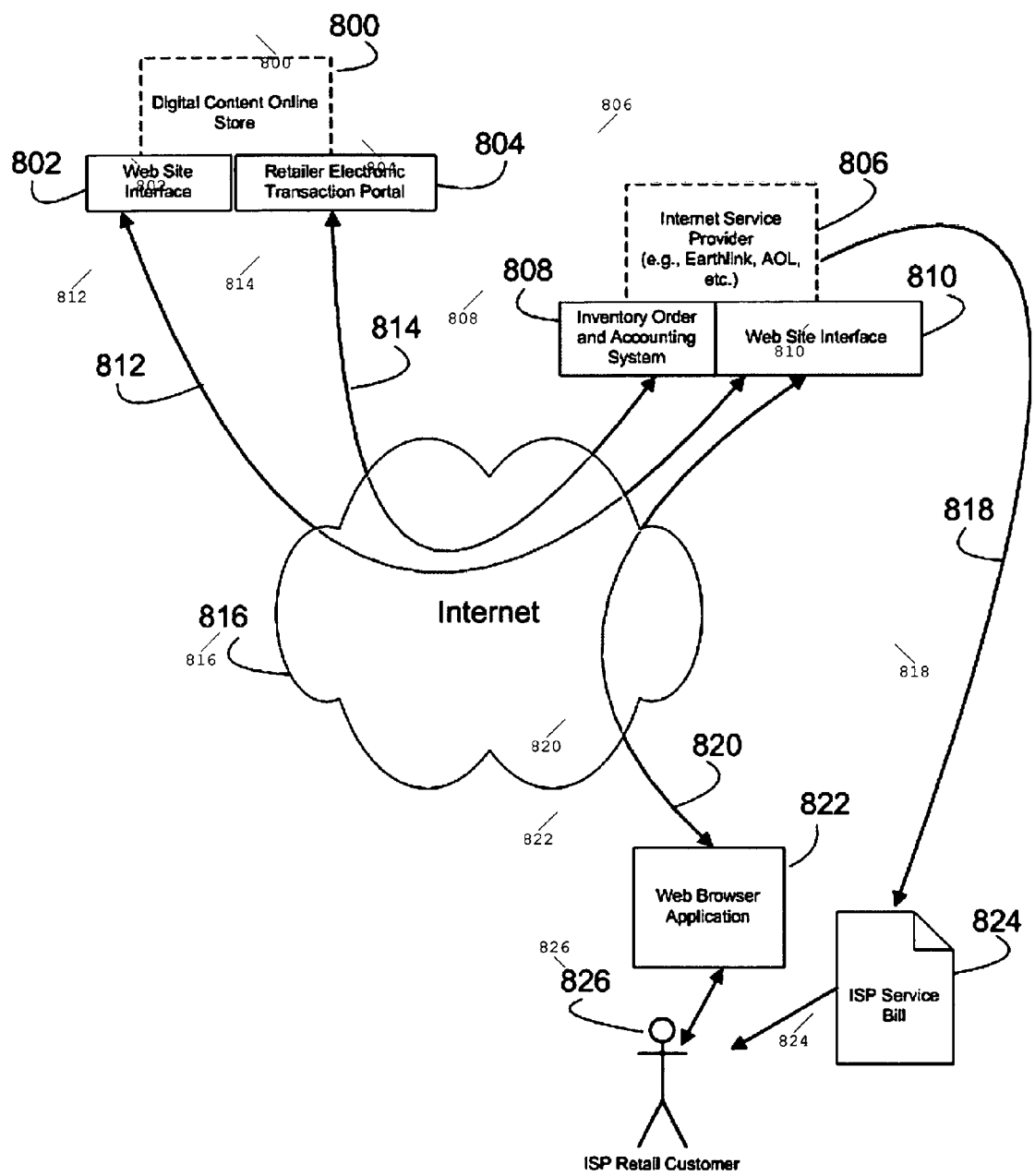
FIG. 8a is an use-case diagram view of an embodiment of the invention's supported business method to support the wholesale of digital content and online content store services through an Internet Service Provider (ISP)

FIG. 8a is an use-case diagram view of a variation of the invention's supported business method to support the wholesale of digital content and online content store service through an Internet Service Provider 806 (ISP). Here, the ISP customer 826, via their ISP web browser 822, conducts digital content purchase or rental transactions directly with their ISP. As with FIG. 7a, the ISP wholesales content from the ISP content store 800 via the ISP web site connection 812 between the ISP store web site 802 and the ISP web site 810.

Electronic business transactions (EBT) for content purchase and rental are exchanged between the ISP transaction portal 804 and the ISP inventory system 808 via the ISP transaction connection 814.

The ISP customer 826 downloads their purchases and rentals across the ISP Internet network 816 via the ISP customer connection 820. Purchases and rental fees are carried though the ISP service billing mechanism 818 and presented to the ISP customer 826 as part of his or her ISP service bill 824.

Figure 8B:
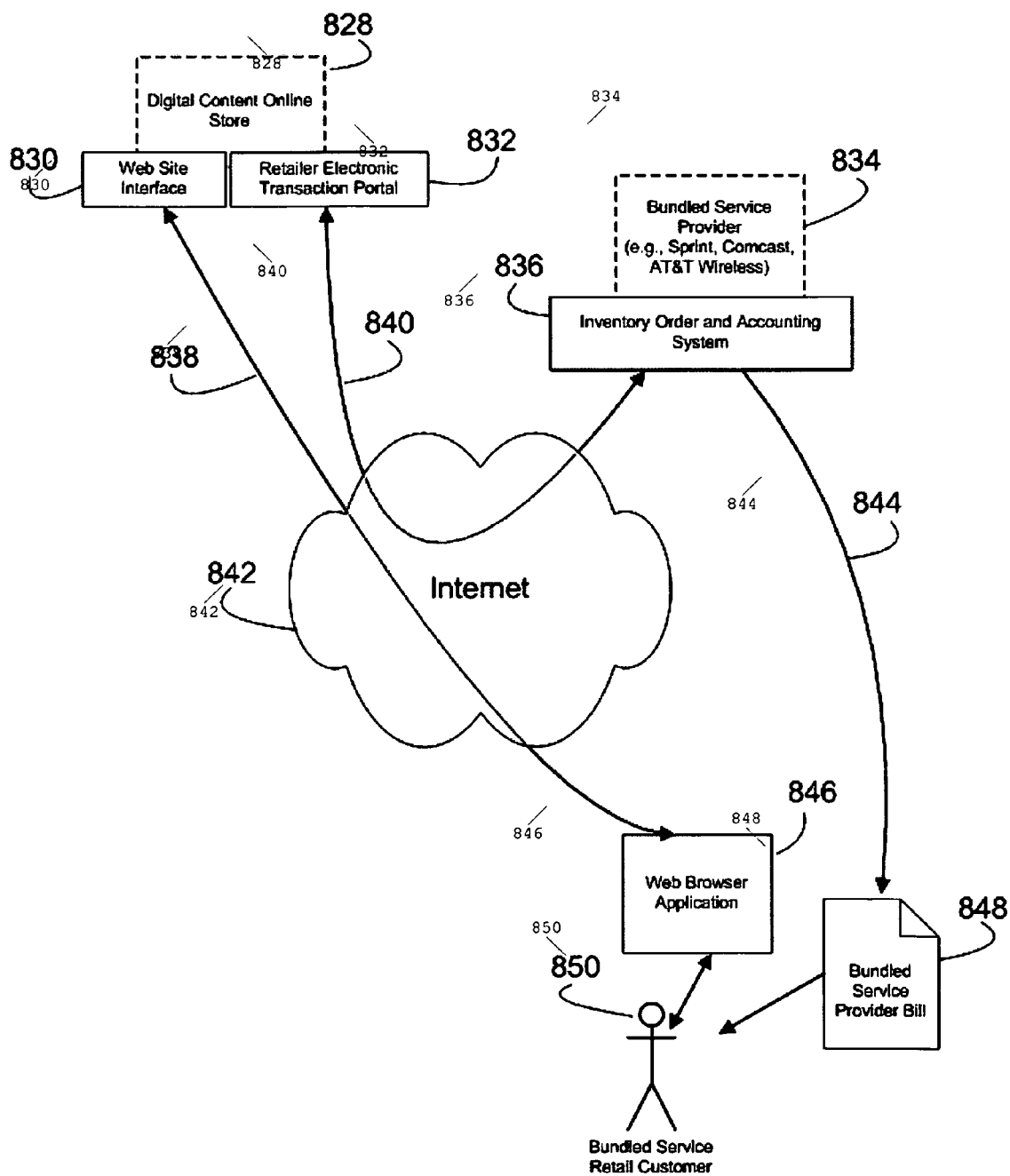
FIG. 8b is an use-case diagram view of an embodiment of the invention's supported business method to support retail sale of digital content integrated with a bundle service provider's billing system.

FIG. 8b is an use-case diagram view of a variation of the invention's supported business method to support retail sale of digital content integrated with a bundled service provider 834 billing system. Here, the bundled service customer 850, via their bundled web browser 846, conducts digital content purchase or rental transactions directly with the bundled store web site 830. Similar to FIG. 7a, the bundled service provider 834 retails content from the bundled content store 828 via the bundled store web site 830 directly. Electronic business transactions (EBT) for content purchase and rental are exchanged between the bundled transaction portal 832 and the bundled inventory system 836 via the bundled transaction connection 840.

The bundled service customer 850 downloads his or her purchases and rentals across the bundled Internet network 842 via the bundled customer connection 838. Purchases and rental fees are carried though the bundled service billing mechanism 844 and presented to the bundled service customer 850 as part of his or her bundled service bill 848. Examples of this would be a Cable TV company Video on Demand (VoD) content rental, or a Wireless Phone Carrier cell-phone music download.

FIG. 8c is an use-case diagram view of a variation of the invention's supported business method to support wholesale of digital content through a traditional catalog retailer 858. Here, the catalog customer 872, via their catalog order connection 874, conducts digital content purchase or rental transactions directly with their catalog provider. As with FIG. 7a, the catalog provider wholesales content from the catalog content store 852 via electronic business transactions (EBT) using the catalog transaction connection 864 between the catalog transaction portal 856 and the catalog inventory system 860.

The catalog customer 872 downloads his or her purchases and rentals across the catalog Internet network 866 from the catalog store web site 854 via the catalog customer web connection 862 and catalog web browser 870. Purchases and rental fees are carried though the catalog billing mechanism 868 and presented to the catalog customer 872 as part of his or her catalog service bill 876.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A device and apparatus for the rental or sale, and secure distribution of digital content for supplying a reliable, traceable, and auditable mechanism of digital content use rights and ownership comprising:

means for storing, accessing, and manipulating digital content;

means for supplying customers with a digital content online store comprising a web-site interface or a business transaction portal interface for the purchase, rental, or manipulation of digital content;

means for supplying connectivity between said digital content online store and a plurality of computers or player devices belonging to digital content purchasers or renters;

means for supplying customer service and client interfaces and applications for interaction with the digital content online store;

means for conducting electronic business transactions for the purchase or rental of digital content;

means for storing customer information related to the sale or rental of digital content, electronically connected to said means for conducting electronic business transactions for the purchase or rental of digital content;

means for storing the digital content inventory of the digital content online store in a digital content database;

means for searching and managing the digital content database, electronically connected to said means for storing the digital content inventory of the digital content online store in a digital content database, and electronically connected to said means for conducting electronic business transactions for the purchase or rental of digital content;

means for encrypting digital content, electronically connected to said means for storing the digital content inventory of the digital content online store in a digital content database, and electronically connected to said means for conducting electronic business transactions for the purchase or rental of digital content;

means for restricting network access to all but legitimate and authorized users, electronically connected to said means for conducting electronic business transactions for the purchase or rental of digital content;

means for supplying a web-site interface to the online digital content store customers, electronically connected to said means for restricting network access to all but legitimate and authorized users;

means for interacting with the online digital content store for download, local management, and decryption of digital content, electronically connected to said means for supplying a web-site interface to the online digital content store customers;

means for supplying a wholesale inventory transaction interface to retail stores or web-sites, electronically connected to said means for restricting network access to all but legitimate and authorized users;

means for starting the digital online shopping process;

means for selecting the online digital content store, sequentially coupled to said means for starting the digital online shopping process;

means for searching and identifying digital content for purchase or rental, sequentially coupled to said means for selecting the online digital content store;

means for controlling and securing the online digital content store for authorized customers, sequentially coupled to said means for searching and identifying digital content for purchase or rental;

means for confirming a currently registered customer of said online digital content store, selectively coupled to said means for controlling and securing the online digital content store for authorized customers;

means for creating a new, or renewing an expired user account for said online digital content store, sequentially coupled to said means for confirming a currently registered customer of said online digital content store;

means for logging into a secure online shopping session, sequentially coupled to said means for creating a new, or renewing an expired user account for said online digital content store, and selectively coupled to said means for controlling and securing the online digital content store for authorized customers;

means for validating customer identity, sequentially coupled to said means for logging into a secure online shopping session;

means for notifying the customer of an invalid log-in attempt, selectively coupled to said means for validating customer identity;

means for purchasing or renting digital content, sequentially coupled to said means for validating customer identity;

means for managing a customer's library of owned or rented digital content, sequentially coupled to said means for purchasing or renting digital content;

means for starting the retail shopping process;

means for selecting a digital content identifier for purchase, sequentially coupled to said means for starting the retail shopping process;

means for entering the digital content identifier into a retail point-of-sale system;

means for transferring a purchase request via an electronic retail portal, selectively coupled to said means for entering the digital content identifier into a retail point-of-sale system;

means for confirming retailer authorization and generating a unique customer digital content identifier, sequentially coupled to said means for transferring a purchase request via an electronic retail portal;

means for returning the unique customer digital content identifier to the retail point-of-sale system, sequentially coupled to said means for confirming retailer authorization and generating a unique customer digital content identifier;

means for purchasing of the unique customer digital content identifier from retailer, sequentially coupled to said means for returning the unique customer digital content identifier to the retail point-of-sale system;

means for searching and identifying said purchased digital content, sequentially coupled to said means for purchasing of the unique customer digital content identifier from retailer;

means for controlling and securing the online digital content store for authorized customers, sequentially coupled to said means for searching and identifying said purchased digital content;

means for confirming a currently registered customer for said online digital content store, selectively coupled to said means for controlling and securing the online digital content store for authorized customers;

means for entering the unique customer digital content identifier of the purchased digital content, sequentially coupled to said means for confirming a currently registered customer for said online digital content store, and selectively coupled to said means for controlling and securing the online digital content store for authorized customers;

means for validating the unique customer digital content identifier, sequentially coupled to said means for entering the unique customer digital content identifier of the purchased digital content;

means for notifying the customer of an invalid unique customer digital content identifier, selectively coupled to said means for validating the unique customer digital content identifier;

means for adding retail purchased digital content to the customer digital content library, sequentially coupled to said means for validating the unique customer digital content identifier;

means for starting the retail rental shopping process;

means for selecting a digital content identifier for retail rental, sequentially coupled to said means for starting the retail rental shopping process;

means for entering the digital content identifier into a retail rental point-of-sale system;

means for transferring a rental purchase request via an electronic retail portal, selectively coupled to said means for entering the digital content identifier into a retail rental point-of-sale system;

means for confirming retailer authorization and generating a unique customer digital content identifier, sequentially coupled to said means for transferring a rental purchase request via an electronic retail portal;

means for returning a unique digital content identifier to a retail point-of-sale system, sequentially coupled to said means for confirming retailer authorization and generating a unique customer digital content identifier;

means for purchasing rental unique customer digital content identifier from retailer, sequentially coupled to said means for returning a unique digital content identifier to a retail point-of-sale system;

means for searching and identifying rental digital content, sequentially coupled to said means for purchasing rental unique customer digital content identifier from retailer;

means for controlling and securing the online digital content store for authorized customers, sequentially coupled to said means for searching and identifying rental digital content;

means for confirming a currently registered online digital content store customer, selectively coupled to said means for controlling and securing the online digital content store for authorized customers;

means for entering unique customer digital content identifier of rental digital content, sequentially coupled to said means for confirming a currently registered online digital content store customer, and selectively coupled to said means for controlling and securing the online digital content store for authorized customers;

means for validating the unique customer digital content identifier, sequentially coupled to said means for entering unique customer digital content identifier of rental digital content;

means for notifying the customer of an invalid identifier, selectively coupled to said means for validating the unique customer digital content identifier;

means for adding retail rental digital content to customer digital content library, sequentially coupled to said means for validating the unique customer digital content identifier;

means for starting the content use process;

means for identifying digital content for use, sequentially coupled to said means for starting the content use process;

means for locating owned or rented digital content, sequentially coupled to said means for identifying digital content for use;

means for contacting the online digital content store to request download of owned or rented digital content, selectively coupled to said means for locating owned or rented digital content;

means for arbitrating a unique encryption key and encrypting the digital content corresponding to said key, sequentially coupled to said means for contacting the online digital content store to request download of owned or rented digital content;

means for downloading the digital content, sequentially coupled to said means for arbitrating a unique encryption key and encrypting the digital content corresponding to said key;

means for storing the digital content on the local device, sequentially coupled to said means for downloading the digital content;

means for validating usage rights of the digital content, sequentially coupled to said means for storing the digital content on the local device, and selectively coupled to said means for locating owned or rented digital content;

means for decrypting the content and streaming it to a content player, sequentially coupled to said means for validating usage rights of the digital content;

means for managing local storage of digital content, sequentially coupled to said means for decrypting the content and streaming it to a content player;

means for checking in digital content from the local device storage back into the customer content library of said online digital content store, selectively coupled to said means for managing local storage of digital content;

means for deleting checked-in digital content from a local device, sequentially coupled to said means for checking in digital content from the local device storage back into the customer content library of said online digital content store; and means for maintaining downloaded content within storage on the local device, selectively coupled to said means for managing local storage of digital content.

2. The device and apparatus for the rental or sale, and secure distribution of digital content in accordance with claim 1, wherein said means for storing, accessing, and manipulating digital content comprises a database for storage of digital content, software application mechanism to encrypt digital content, software application to search and organize digital content database server.

3. The device and apparatus for the rental or sale, and secure distribution of digital content in accordance with claim 1, wherein said means for supplying customers with a digital content online store comprising a web-site interface or a business transaction portal interface for the purchase, rental, or manipulation of digital content comprises an internet web-site interface, customer billing software application, internet security firewall software application, customer database software application, customer authentication software application, digital content encryption and key-generation software application gateway server.

4. The device and apparatus for the rental or sale, and secure distribution of digital content in accordance with claim 1, wherein said means for supplying connectivity between said digital content online store and a plurality of computers or player devices belonging to digital content purchasers or renters comprises a connection between the online digital content store and customer computers, a private network or a public network like the internet computer network.

5. The device and apparatus for the rental or sale, and secure distribution of digital content in accordance with claim 1, wherein said means for supplying customer service and client interfaces and applications for interaction with the digital content online store comprises a connection to an access network link, client interface to the digital content online store, client software application for the generation of cryptographic keys based on unique attributes of the device, client software application for cryptographic key exchange and decryption of digital content, client software application for accessing and managing local digital content, plurality of software applications for the playing and experience of digital content customer device.

6. The device and apparatus for the rental or sale, and secure distribution of digital content in accordance with claim 1, wherein said means for conducting electronic business transactions for the purchase or rental of digital content comprises a means for online electronic business transactions, means for unique identification of customers, interface with a customer database software application, interface with a secure gateway firewall application, interface with the digital content encryption software application, interface with the digital content inventory application transaction software application.

7. The device and apparatus for the rental or sale, and secure distribution of digital content in accordance with claim 1, wherein said means for storing customer information related to the sale or rental of digital content comprises a repository for customer account information, means to search and access customer account information, data store of customer transaction histories, data store of customer purchase or rental records, data store of customer inventory status containing information on owned, rented, checked-in, or checked-out content customer database.

8. The device and apparatus for the rental or sale, and secure distribution of digital content in accordance with claim 1, wherein said means for storing the digital content inventory of the digital content online store in a digital content database comprises a plurality of digital content for sale or rental content database.

9. The device and apparatus for the rental or sale, and secure distribution of digital content in accordance with claim 1, wherein said means for searching and managing the digital content database comprises a means for searching a digital content database, means for identification and selection of digital content for purchase or rental inventory application.

10. The device and apparatus for the rental or sale, and secure distribution of digital content in accordance with claim 1, wherein said means for encrypting digital content comprises a means for encrypting and decrypting digital content, means for exchange of cryptographic keys with customer client software applications, means of per-customer unique encryption of digital content encryption application.

11. The device and apparatus for the rental or sale, and secure distribution of digital content in accordance with claim 1, wherein said means for restricting network access to all but legitimate and authorized users comprises a means for restricting network communication, means for authenticating network communications, means for defeating unauthorized network communication, means for resisting malicious communication attempts gateway application.

12. The device and apparatus for the rental or sale, and secure distribution of digital content in accordance with claim 1, wherein said means for supplying a web-site interface to the online digital content store customers comprises a web-site interface, means for internet customer interaction with the online digital content store, means for secure, online transactions web interface application.

13. The device and apparatus for the rental or sale, and secure distribution of digital content in accordance with claim 1, wherein said means for interacting with the online digital content store for download, local management, and decryption of digital content comprises a means for secure communication with the online digital content store, means for cryptographic key generation, means for cryptographic key exchange with the online digital content store, means for downloading digital content from the online digital content store, means for storing and accessing digital content on a local device, means for validating user identification and authorization, means for decrypting stored digital content, means for interfacing to local software or hardware for the experience of decrypted digital content, mechanism for managing the local inventory of downloaded digital content content management application.

14. The device and apparatus for the rental or sale, and secure distribution of digital content in accordance with claim 1, wherein said means for supplying a wholesale inventory transaction interface to retail stores or web-sites comprises a means for electronic business transactions, interface for retail purchasing systems, interface for retail inventory management systems, interface for retail billing systems, means for unique identification of purchased or rented content, means for exchanging inventory and unique identification information retail transaction portal.

15. The device and apparatus for the rental or sale, and secure distribution of digital content in accordance with claim 1, wherein said means for searching and identifying digital content for purchase or rental comprises a means for customer access to available digital content, means for structured searching of available digital content, means to store one or more digital content items in a queue for purchase or rental browsing step.

16. The device and apparatus for the rental or sale, and secure distribution of digital content in accordance with claim 1, wherein said means for controlling and securing the online digital content store for authorized customers comprises a means for logging in to a secure transaction web interface, means for validating customer identity authentication step.

17. The device and apparatus for the rental or sale, and secure distribution of digital content in accordance with claim 1, wherein said means for confirming a currently registered customer of said online digital content store comprises a means for checking customer identifier, means for validating customer identity membership step.

18. The device and apparatus for the rental or sale, and secure distribution of digital content in accordance with claim 1, wherein said means for creating a new, or renewing an expired user account for said online digital content store comprises a means for creating a new user account, means for creating a user identifier, means for creating a security authentication identifier, means for renewing an expired account new account step.

19. The device and apparatus for the rental or sale, and secure distribution of digital content in accordance with claim 1, wherein said means for logging into a secure online shopping session comprises a means for starting a secure transaction, means for validating security identifier log-in step.

20. The device and apparatus for the rental or sale, and secure distribution of digital content in accordance with claim 1, wherein said means for validating customer identity comprises a means for validating a customer identifier, means for validating a security identifier validation step.

21. The device and apparatus for the rental or sale, and secure distribution of digital content in accordance with claim 1, wherein said means for notifying the customer of an invalid log-in attempt comprises a means to display authorization rejection log-in failure step.

22. The device and apparatus for the rental or sale, and secure distribution of digital content in accordance with claim 1, wherein said means for purchasing or renting digital content comprises a means for searching said online digital content store inventory, means for identifying content for purchase or rental, means for online purchase or rental transactions, means for tracking purchased or rented digital content, means for receipting purchased or rented content purchase step.

23. The device and apparatus for the rental or sale, and secure distribution of digital content in accordance with claim 1, wherein said means for managing a customer's library of owned or rented digital content comprises a means to display new content in customer library, means to search and organize all customer content, means to identify content for customer download, means to display remaining duration on rented content, means to present customer with rental terms and conditions, means to check-out content from the customer library, means to check-in content back into the customer library addition step.

24. The device and apparatus for the rental or sale, and secure distribution of digital content in accordance with claim 1, wherein said means for selecting a digital content identifier for purchase comprises a means to identify a digital content title, means to convey the digital content identity to retail store purchase system purchase content selection step.

25. The device and apparatus for the rental or sale, and secure distribution of digital content in accordance with claim 1, wherein said means for entering the digital content identifier into a retail point-of-sale system comprises a means to represent a digital content identifier for said digital content, means to convey the digital content identifier in machine-readable form, means to convey the digital content identifier in human-readable form purchase identifier entry step.

26. The device and apparatus for the rental or sale, and secure distribution of digital content in accordance with claim 1, wherein said means for transferring a purchase request via an electronic retail portal comprises a means to contact an electronic retail portal, means to convey a digital content identifier to a retail portal, means to conduct a purchase transaction via a retail portal purchase authorization step.

27. The device and apparatus for the rental or sale, and secure distribution of digital content in accordance with claim 1, wherein said means for confirming retailer authorization and generating a unique customer digital content identifier comprises a means to identify a retailer, means to validate said retailer for transactions, means to search digital content inventory for requested digital content, means to generate a unique content identifier for later customer use, means to conduct a credit or electronic banking transaction with retail point-of-sale system retail purchase transaction step.

28. The device and apparatus for the rental or sale, and secure distribution of digital content in accordance with claim 1, wherein said means for returning the unique customer digital content identifier to the retail point-of-sale system comprises a means to indicate a successful retail purchase transaction, means to convey the unique customer digital content identifier, means to indicate a retail transaction failure purchase transaction response step.

29. The device and apparatus for the rental or sale, and secure distribution of digital content in accordance with claim 1, wherein said means for purchasing of the unique customer digital content identifier from retailer comprises a means to convey the unique customer digital content identifier to retail customer, means to convey the unique customer digital content identifier in human-readable form content purchase step.

30. The device and apparatus for the rental or sale, and secure distribution of digital content in accordance with claim 1, wherein said means for searching and identifying said purchased digital content comprises a means for customer access to available digital content, means for entering the unique customer digital content identifier contact store purchase step.

31. The device and apparatus for the rental or sale, and secure distribution of digital content in accordance with claim 1, wherein said means for controlling and securing the online digital content store for authorized customers comprises a means for logging in to a secure transaction web interface, means for validating customer identity, means for validating security identifier, means for starting a secure transaction retail purchase authentication step.

32. The device and apparatus for the rental or sale, and secure distribution of digital content in accordance with claim 1, wherein said means for confirming a currently registered customer for said online digital content store comprises a means for validating the customer identifier, means for validating the customer identity, means to display customer authorization rejection retail purchase membership step.

33. The device and apparatus for the rental or sale, and secure distribution of digital content in accordance with claim 1, wherein said means for entering the unique customer digital content identifier of the purchased digital content comprises a means for entering the unique customer digital content identifier purchase identifier selection step.

34. The device and apparatus for the rental or sale, and secure distribution of digital content in accordance with claim 1, wherein said means for validating the unique customer digital content identifier comprises a means to validate the unique customer digital content identifier purchase identifier validation step.

35. The device and apparatus for the rental or sale, and secure distribution of digital content in accordance with claim 1, wherein said means for notifying the customer of an invalid unique customer digital content identifier comprises a means to convey digital content identifier failure to customer, means to track invalid digital content identifier submission purchase identifier rejection step.

36. The device and apparatus for the rental or sale, and secure distribution of digital content in accordance with claim 1, wherein said means for adding retail purchased digital content to the customer digital content library comprises a means to add purchased digital content to customer library, means to update customer inventory, means to track transaction and retail source retail purchase library step.

37. The device and apparatus for the rental or sale, and secure distribution of digital content in accordance with claim 1, wherein said means for selecting a digital content identifier for retail rental comprises a means to identify a digital content title, means to convey that identity to a retail store rental purchase system rental content selection step.

38. The device and apparatus for the rental or sale, and secure distribution of digital content in accordance with claim 1, wherein said means for entering the digital content identifier into a retail rental point-of-sale system comprises a means to represent a digital content identifier, means to convey an identifier in machine-readable form, means to convey an identifier in human-readable form rental identifier entry step.

39. The device and apparatus for the rental or sale, and secure distribution of digital content in accordance with claim 1, wherein said means for transferring a rental purchase request via an electronic retail portal comprises a means to contact an electronic retail portal, means to convey a digital content identifier to a retail portal, means to conduct a purchase transaction via a retail portal rental authorization step.

40. The device and apparatus for the rental or sale, and secure distribution of digital content in accordance with claim 1, wherein said means for confirming retailer authorization and generating a unique customer digital content identifier comprises a means to identify a retailer, means to validate retailer for transactions, means to search digital content inventory for requested content, means to generate a unique digital content identifier for later customer use, means to conduct a credit or electronic banking transaction with retail point-of-sale system retail rental transaction step.

41. The device and apparatus for the rental or sale, and secure distribution of digital content in accordance with claim 1, wherein said means for returning a unique digital content identifier to a retail point-of-sale system comprises a means to indicate a successful transaction, means to convey unique digital content identifier, means to indicate a transaction failure rental transaction response step.

42. The device and apparatus for the rental or sale, and secure distribution of digital content in accordance with claim 1, wherein said means for purchasing rental unique customer digital content identifier from retailer comprises a means to convey a the unique customer digital content identifier to retail rental customer, means to convey the unique digital content identifier in human-readable form content rental step.

43. The device and apparatus for the rental or sale, and secure distribution of digital content in accordance with claim 1, wherein said means for searching and identifying rental digital content comprises a means for customer access to available rental digital content, means for entering the unique customer digital content identifier contact store rental step.

44. The device and apparatus for the rental or sale, and secure distribution of digital content in accordance with claim 1, wherein said means for controlling and securing the online digital content store for authorized customers comprises a means for logging in to a secure transaction web interface, means for validating customer identity, means for validating security identifier, means for starting a secure transaction retail rental authentication step.

45. The device and apparatus for the rental or sale, and secure distribution of digital content in accordance with claim 1, wherein said means for confirming a currently registered online digital content store customer comprises a means for checking customer identifier, means for validating customer identity, means to display authorization rejection retail rental membership step.

46. The device and apparatus for the rental or sale, and secure distribution of digital content in accordance with claim 1, wherein said means for entering unique customer digital content identifier of rental digital content comprises a means for entering the unique customer digital content identifier rental identifier selection step.

47. The device and apparatus for the rental or sale, and secure distribution of digital content in accordance with claim 1, wherein said means for validating the unique customer digital content identifier comprises a means to validate the digital content identifier rental identifier validation step.

48. The device and apparatus for the rental or sale, and secure distribution of digital content in accordance with claim 1, wherein said means for notifying the customer of an invalid identifier comprises a means to convey identifier failure to customer, means to track invalid identifier submission rental identifier rejection step.

49. The device and apparatus for the rental or sale, and secure distribution of digital content in accordance with claim 1, wherein said means for adding retail rental digital content to customer digital content library comprises a means to add rented content to customer digital content library, means to validate rental terms and conditions, means to enforce rental terms and conditions, means to update customer inventory, means to track transaction and retail source retail rental library step.

50. The device and apparatus for the rental or sale, and secure distribution of digital content in accordance with claim 1, wherein said means for identifying digital content for use comprises a means for storing titles of owned or rented digital content, means for searching digital content titles content search step.

51. The device and apparatus for the rental or sale, and secure distribution of digital content in accordance with claim 1, wherein said means for locating owned or rented digital content comprises a means for identifying downloaded and non-downloaded digital content localizer step.

52. The device and apparatus for the rental or sale, and secure distribution of digital content in accordance with claim 1, wherein said means for contacting the online digital content store to request download of owned or rented digital content comprises a means to log-in to the online digital content store, means to identify digital content for download, means to establish a secure connection to the online store, means to request download request step.

53. The device and apparatus for the rental or sale, and secure distribution of digital content in accordance with claim 1, wherein said means for arbitrating a unique encryption key and encrypting the digital content corresponding to said key comprises a means to uniquely identify customer's local device, means to associate unique device to customer identity, means to communicate unique device identifier with the online digital content store encryption software application, means to arbitrate a cryptographic key and algorithm based on device unique identifier, means to encrypt the requested content with said key and algorithm key generation step.

54. The device and apparatus for the rental or sale, and secure distribution of digital content in accordance with claim 1, wherein said means for downloading the digital content comprises a means to download digital content from the online digital content store to the local device, means to establish a secure connection to said digital online content store for download step.

55. The device and apparatus for the rental or sale, and secure distribution of digital content in accordance with claim 1, wherein said means for storing the digital content on the local device comprises a means to store digital content on the local device, means to identify the digital content for later retrieval, means to store cryptographic key data for use in decryption of the digital content local storage step.

56. The device and apparatus for the rental or sale, and secure distribution of digital content in accordance with claim 1, wherein said means for validating usage rights of the digital content comprises a means to verify digital integrity of the digital content, means to identify and said digital content enforce usage rights terms and conditions of said digital content, means to verify the cryptographic key and cryptographic validity content validity step.

57. The device and apparatus for the rental or sale, and secure distribution of digital content in accordance with claim 1, wherein said means for decrypting the content and streaming it to a content player comprises a means to experience the digital content, means to interface to a digital content player, means to decrypt the digital content, means to prevent unauthorized access to decrypted digital image of said digital content experience step.

58. The device and apparatus for the rental or sale, and secure distribution of digital content in accordance with claim 1, wherein said means for managing local storage of digital content comprises a means to interface with the local user, means to enable the user to determine local storage, means to enable the user to check-in the digital content to their digital online store library local content storage step.

59. The device and apparatus for the rental or sale, and secure distribution of digital content in accordance with claim 1, wherein said means for checking in digital content from the local device storage back into the customer content library of said online digital content store comprises a means to contact the digital online content store, means to establish a secure connection with the digital online content store, means to identify digital content stored locally, means to check-in local digital content, means to display customer library of available, checked-in, and checked-out digital content, means to display newly checked-in digital content as available for check-out, means to show locally stored digital content as checked-out content check-in step.

60. The device and apparatus for the rental or sale, and secure distribution of digital content in accordance with claim 1, wherein said means for deleting checked-in digital content from a local device comprises a means to delete local copy of digital content upon library check-in checked-in content deletion step.

61. The device and apparatus for the rental or sale, and secure distribution of digital content in accordance with claim 1, wherein said means for maintaining downloaded content within storage on the local device comprises a local content step.

62. A device and apparatus for the rental or sale, and secure distribution of digital content for supplying a reliable, traceable, and auditable mechanism of digital content use rights and ownership comprising:

a database for storage of digital content, software application mechanism to encrypt digital content, software application to search and organize digital content database server, for storing, accessing, and manipulating digital content;

an internet web-site interface, customer billing software application, internet security firewall software application, customer database software application, customer authentication software application, digital content encryption and key-generation software application gateway server, for supplying customers with a digital content online store comprising a web-site interface or a business transaction portal interface for the purchase, rental, or manipulation of digital content;

a connection between the online digital content store and customer computers, a private network or a public network like the internet computer network, for supplying connectivity between said digital content online store and a plurality of computers or player devices belonging to digital content purchasers or renters;

a connection to an access network link, client interface to the digital content online store, client software application for the generation of cryptographic keys based on unique attributes of the device, client software application for cryptographic key exchange and decryption of digital content, client software application for accessing and managing local digital content, plurality of software applications for the playing and experience of digital content customer device, for supplying customer service and client interfaces and applications for interaction with the digital content online store;

a means for online electronic business transactions, means for unique identification of customers, interface with a customer database software application, interface with a secure gateway firewall application, interface with the digital content encryption software application, interface with the digital content inventory application transaction software application, for conducting electronic business transactions for the purchase or rental of digital content;

a repository for customer account information, means to search and access customer account information, data store of customer transaction histories, data store of customer purchase or rental records, data store of customer inventory status containing information on owned, rented, checked-in, or checked-out content customer database, for storing customer information related to the sale or rental of digital content, electronically connected to said transaction software application;

a plurality of digital content for sale or rental content database, for storing the digital content inventory of the digital content online store in a digital content database;

a means for searching a digital content database, means for identification and selection of digital content for purchase or rental inventory application, for searching and managing the digital content database, electronically connected to said content database, and electronically connected to said transaction software application;

a means for encrypting and decrypting digital content, means for exchange of cryptographic keys with customer client software applications, means of per-customer unique encryption of digital content encryption application, for encrypting digital content, electronically connected to said content database, and electronically connected to said transaction software application;

a means for restricting network communication, means for authenticating network communications, means for defeating unauthorized network communication, means for resisting malicious communication attempts gateway application, for restricting network access to all but legitimate and authorized users, electronically connected to said transaction software application;

a web-site interface, means for internet customer interaction with the online digital content store, means for secure, online transactions web interface application, for supplying a web-site interface to the online digital content store customers, electronically connected to said gateway application;

a means for secure communication with the online digital content store, means for cryptographic key generation, means for cryptographic key exchange with the online digital content store, means for downloading digital content from the online digital content store, means for storing and accessing digital content on a local device, means for validating user identification and authorization, means for decrypting stored digital content, means for interfacing to local software or hardware for the experience of decrypted digital content, mechanism for managing the local inventory of downloaded digital content management application, for interacting with the online digital content store for download, local management, and decryption of digital content, electronically connected to said web interface application;

a means for electronic business transactions, interface for retail purchasing systems, interface for retail inventory management systems, interface for retail billing systems, means for unique identification of purchased or rented content, means for exchanging inventory and unique identification information retail transaction portal, for supplying a wholesale inventory transaction interface to retail stores or web-sites, electronically connected to said gateway application;

a shopping step, for starting the digital online shopping process;

a select store step, for selecting the online digital content store, sequentially coupled to said shopping step;

a means for customer access to available digital content, means for structured searching of available digital content, means to store one or more digital content items in a queue for purchase or rental browsing step, for searching and identifying digital content for purchase or rental, sequentially coupled to said select store step;

a means for logging in to a secure transaction web interface, means for validating customer identity authentication step, for controlling and securing the online digital content store for authorized customers, sequentially coupled to said browsing step;

a means for checking customer identifier, means for validating customer identity membership step, for confirming a currently registered customer of said online digital content store, selectively coupled to said authentication step;

a means for creating a new user account, means for creating a user identifier, means for creating a security authentication identifier, means for renewing an expired account new account step, for creating a new, or renewing an expired user account for said online digital content store, sequentially coupled to said membership step;

a means for starting a secure transaction, means for validating security identifier log-in step, for logging into a secure online shopping session, sequentially coupled to said new account step, and selectively coupled to said authentication step;

a means for validating a customer identifier, means for validating a security identifier validation step, for validating customer identity, sequentially coupled to said log-in step;

a means to display authorization rejection log-in failure step, for notifying the customer of an invalid log-in attempt, selectively coupled to said validation step;

a means for searching said online digital content store inventory, means for identifying content for purchase or rental, means for online purchase or rental transactions, means for tracking purchased or rented digital content, means for receipting purchased or rented content purchase step, for purchasing or renting digital content, sequentially coupled to said validation step;

a means to display new content in customer library, means to search and organize all customer content, means to identify content for customer download, means to display remaining duration on rented content, means to present customer with rental terms and conditions, means to check-out content from the customer library, means to check-in content back into the customer library addition step, for managing a customer's library of owned or rented digital content, sequentially coupled to said purchase step;

a retail purchase shopping step, for starting the retail shopping process;

a means to identify a digital content title, means to convey the digital content identity to retail store purchase system purchase content selection step, for selecting a digital content identifier for purchase, sequentially coupled to said retail purchase shopping step;

a means to represent a digital content identifier for said digital content, means to convey the digital content identifier in machine-readable form, means to convey the digital content identifier in human-readable form purchase identifier entry step, for entering the digital content identifier into a retail point-of-sale system;

a means to contact an electronic retail portal, means to convey a digital content identifier to a retail portal, means to conduct a purchase transaction via a retail portal purchase authorization step, for transferring a purchase request via an electronic retail portal, selectively coupled to said purchase identifier entry step;

a means to identify a retailer, means to validate said retailer for transactions, means to search digital content inventory for requested digital content, means to generate a unique content identifier for later customer use, means to conduct a credit or electronic banking transaction with retail point-of-sale system retail purchase transaction step, for confirming retailer authorization and generating a unique customer digital content identifier, sequentially coupled to said purchase authorization step;

a means to indicate a successful retail purchase transaction, means to convey the unique customer digital content identifier, means to indicate a retail transaction failure purchase transaction response step, for returning the unique customer digital content identifier to the retail point-of-sale system, sequentially coupled to said retail purchase transaction step;

a means to convey the unique customer digital content identifier to retail customer, means to convey the unique customer digital content identifier in human-readable form content purchase step, for purchasing of the unique customer digital content identifier from retailer, sequentially coupled to said purchase transaction response step;

a means for customer access to available digital content, means for entering the unique customer digital content identifier contact store purchase step, for searching and identifying said purchased digital content, sequentially coupled to said content purchase step;

a means for logging in to a secure transaction web interface, means for validating customer identity, means for validating security identifier, means for starting a secure transaction retail purchase authentication step, for controlling and securing the online digital content store for authorized customers, sequentially coupled to said contact store purchase step;

a means for validating the customer identifier, means for validating the customer identity, means to display customer authorization rejection retail purchase membership step, for confirming a currently registered customer for said online digital content store, selectively coupled to said retail purchase authentication step;

a means for entering the unique customer digital content identifier purchase identifier selection step, for entering the unique customer digital content identifier of the purchased digital content, sequentially coupled to said retail purchase membership step, and selectively coupled to said retail purchase authentication step;

a means to validate the unique customer digital content identifier purchase identifier validation step, for validating the unique customer digital content identifier, sequentially coupled to said purchase identifier selection step;

a means to convey digital content identifier failure to customer, means to track invalid digital content identifier submission purchase identifier rejection step, for notifying the customer of an invalid unique customer digital content identifier, selectively coupled to said purchase identifier validation step;

a means to add purchased digital content to customer library, means to update customer inventory, means to track transaction and retail source retail purchase library step, for adding retail purchased digital content to the customer digital content library, sequentially coupled to said purchase identifier validation step;

a retail rental shopping step, for starting the retail rental shopping process;

a means to identify a digital content title, means to convey that identity to a retail store rental purchase system rental content selection step, for selecting a digital content identifier for retail rental, sequentially coupled to said retail rental shopping step;

a means to represent a digital content identifier, means to convey an identifier in machine-readable form, means to convey an identifier in human-readable form rental identifier entry step, for entering the digital content identifier into a retail rental point-of-sale system;

a means to contact an electronic retail portal, means to convey a digital content identifier to a retail portal, means to conduct a purchase transaction via a retail portal rental authorization step, for transferring a rental purchase request via an electronic retail portal, selectively coupled to said rental identifier entry step;

a means to identify a retailer, means to validate retailer for transactions, means to search digital content inventory for requested content, means to generate a unique digital content identifier for later customer use, means to conduct a credit or electronic banking transaction with retail point-of-sale system retail rental transaction step, for confirming retailer authorization and generating a unique customer digital content identifier, sequentially coupled to said rental authorization step;

a means to indicate a successful transaction, means to convey unique digital content identifier, means to indicate a transaction failure rental transaction response step, for returning a unique digital content identifier to a retail point-of-sale system, sequentially coupled to said retail rental transaction step;

a means to convey a the unique customer digital content identifier to retail rental customer, means to convey the unique digital content identifier in human-readable form content rental step, for purchasing rental unique customer digital content identifier from retailer, sequentially coupled to said rental transaction response step;

a means for customer access to available rental digital content, means for entering the unique customer digital content identifier contact store rental step, for searching and identifying rental digital content, sequentially coupled to said content rental step;

a means for logging in to a secure transaction web interface, means for validating customer identity, means for validating security identifier, means for starting a secure transaction retail rental authentication step, for controlling and securing the online digital content store for authorized customers, sequentially coupled to said contact store rental step;

a means for checking customer identifier, means for validating customer identity, means to display authorization rejection retail rental membership step, for confirming a currently registered online digital content store customer, selectively coupled to said retail rental authentication step;

a means for entering the unique customer digital content identifier rental identifier selection step, for entering unique customer digital content identifier of rental digital content, sequentially coupled to said retail rental membership step, and selectively coupled to said retail rental authentication step;

a means to validate the digital content identifier rental identifier validation step, for validating the unique customer digital content identifier, sequentially coupled to said rental identifier selection step;

a means to convey identifier failure to customer, means to track invalid identifier submission rental identifier rejection step, for notifying the customer of an invalid identifier, selectively coupled to said rental identifier validation step;

a means to add rented content to customer digital content library, means to validate rental terms and conditions, means to enforce rental terms and conditions, means to update customer inventory, means to track transaction and retail source retail rental library step, for adding retail rental digital content to customer digital content library, sequentially coupled to said rental identifier validation step;

a content use step, for starting the content use process;

a means for storing titles of owned or rented digital content, means for searching digital content titles content search step, for identifying digital content for use, sequentially coupled to said content use step;

a means for identifying downloaded and non-downloaded digital content localizer step, for locating owned or rented digital content, sequentially coupled to said content search step;

a means to log-in to the online digital content store, means to identify digital content for download, means to establish a secure connection to the online store, means to request download request step, for contacting the online digital content store to request download of owned or rented digital content, selectively coupled to said content localizer step;

a means to uniquely identify customer's local device, means to associate unique device to customer identity, means to communicate unique device identifier with the online digital content store encryption software application, means to arbitrate a cryptographic key and algorithm based on device unique identifier, means to encrypt the requested content with said key and algorithm key generation step, for arbitrating a unique encryption key and encrypting the digital content corresponding to said key, sequentially coupled to said download request step;

a means to download digital content from the online digital content store to the local device, means to establish a secure connection to said digital online content store for download step, for downloading the digital content, sequentially coupled to said key generation step;

a means to store digital content on the local device, means to identify the digital content for later retrieval, means to store cryptographic key data for use in decryption of the digital content local storage step, for storing the digital content on the local device, sequentially coupled to said download step;

a means to verify digital integrity of the digital content, means to identify and said digital content enforce usage rights terms and conditions of said digital content, means to verify the cryptographic key and cryptographic validity content validity step, for validating usage rights of the digital content, sequentially coupled to said local storage step, and selectively coupled to said content localizer step;

a means to experience the digital content, means to interface to a digital content player, means to decrypt the digital content, means to prevent unauthorized access to decrypted digital image of said digital content experience step, for decrypting the content and streaming it to a content player, sequentially coupled to said content validity step;

a means to interface with the local user, means to enable the user to determine local storage, means to enable the user to check-in the digital content to their digital online store library local content storage step, for managing local storage of digital content, sequentially coupled to said content experience step;

a means to contact the digital online content store, means to establish a secure connection with the digital online content store, means to identify digital content stored locally, means to check-in local digital content, means to display customer library of available, checked-in, and checked-out digital content, means to display newly checked-in digital content as available for check-out, means to show locally stored digital content as checked-out content check-in step, for checking in digital content from the local device storage back into the customer content library of said online digital content store, selectively coupled to said local content storage step;

a means to delete local copy of digital content upon library check-in checked-in content deletion step, for deleting checked-in digital content from a local device, sequentially coupled to said content check-in step; and a local content step, for maintaining downloaded content within storage on the local device, selectively coupled to said local content storage step.

63. A device and apparatus for the rental or sale, and secure distribution of digital content for supplying a reliable, traceable, and auditable mechanism of digital content use rights and ownership comprising:

a database for storage of digital content, software application mechanism to encrypt digital content, software application to search and organize digital content database server, for storing, accessing, and manipulating digital content;

an internet web-site interface, customer billing software application, internet security firewall software application, customer database software application, customer authentication software application, digital content encryption and key-generation software application gateway server, for supplying customers with a digital content online store comprising a web-site interface or a business transaction portal interface for the purchase, rental, or manipulation of digital content;

a high-capacity network connection between computers in a digital content store private network, for linking a content database server and a customer interface server, electronically connected to said gateway server, and electronically connected to said database server;

a connection between the online digital content store and customer computers, a private network or a public network like the internet computer network, for supplying connectivity between said digital content online store and a plurality of computers or player devices belonging to digital content purchasers or renters;

a connection to an access network link, client interface to the digital content online store, client software application for the generation of cryptographic keys based on unique attributes of the device, client software application for cryptographic key exchange and decryption of digital content, client software application for accessing and managing local digital content, plurality of software applications for the playing and experience of digital content customer device, for supplying customer service and client interfaces and applications for interaction with the digital content online store;

a means for online electronic business transactions, means for unique identification of customers, interface with a customer database software application, interface with a secure gateway firewall application, interface with the digital content encryption software application, interface with the digital content inventory application transaction software application, for conducting electronic business transactions for the purchase or rental of digital content;

a repository for customer account information, means to search and access customer account information, data store of customer transaction histories, data store of customer purchase or rental records, data store of customer inventory status containing information on owned, rented, checked-in, or checked-out content customer database, for storing customer information related to the sale or rental of digital content, electronically connected to said transaction software application;

a plurality of digital content for sale or rental content database, for storing the digital content inventory of the digital content online store in a digital content database;

a means for searching a digital content database, means for identification and selection of digital content for purchase or rental inventory application, for searching and managing the digital content database, electronically connected to said content database, and electronically connected to said transaction software application;

a means for encrypting and decrypting digital content, means for exchange of cryptographic keys with customer client software applications, means of per-customer unique encryption of digital content encryption application, for encrypting digital content, electronically connected to said content database, and electronically connected to said transaction software application;

a means for restricting network communication, means for authenticating network communications, means for defeating unauthorized network communication, means for resisting malicious communication attempts gateway application, for restricting network access to all but legitimate and authorized users, electronically connected to said transaction software application;

a web-site interface, means for internet customer interaction with the online digital content store, means for secure, online transactions web interface application, for supplying a web-site interface to the online digital content store customers, electronically connected to said gateway application;

a means for secure communication with the online digital content store, means for cryptographic key generation, means for cryptographic key exchange with the online digital content store, means for downloading digital content from the online digital content store, means for storing and accessing digital content on a local device, means for validating user identification and authorization, means for decrypting stored digital content, means for interfacing to local software or hardware for the experience of decrypted digital content, mechanism for managing the local inventory of downloaded digital content management application, for interacting with the online digital content store for download, local management, and decryption of digital content, electronically connected to said web interface application;

a means for electronic business transactions, interface for retail purchasing systems, interface for retail inventory management systems, interface for retail billing systems, means for unique identification of purchased or rented content, means for exchanging inventory and unique identification information retail transaction portal, for supplying a wholesale inventory transaction interface to retail stores or web-sites, electronically connected to said gateway application;

a shopping step, for starting the digital online shopping process;

a select store step, for selecting the online digital content store, sequentially coupled to said shopping step;

a means for customer access to available digital content, means for structured searching of available digital content, means to store one or more digital content items in a queue for purchase or rental browsing step, for searching and identifying digital content for purchase or rental, sequentially coupled to said select store step;

a means for logging in to a secure transaction web interface, means for validating customer identity authentication step, for controlling and securing the online digital content store for authorized customers, sequentially coupled to said browsing step;

a means for checking customer identifier, means for validating customer identity membership step, for confirming a currently registered customer of said online digital content store, selectively coupled to said authentication step;

a means for creating a new user account, means for creating a user identifier, means for creating a security authentication identifier, means for renewing an expired account new account step, for creating a new, or renewing an expired user account for said online digital content store, sequentially coupled to said membership step;

a means for starting a secure transaction, means for validating security identifier log-in step, for logging into a secure online shopping session, sequentially coupled to said new account step, and selectively coupled to said authentication step;

a means for validating a customer identifier, means for validating a security identifier validation step, for validating customer identity, sequentially coupled to said log-in step;

a means to display authorization rejection log-in failure step, for notifying the customer of an invalid log-in attempt, selectively coupled to said validation step;

a means for searching said online digital content store inventory, means for identifying content for purchase or rental, means for online purchase or rental transactions, means for tracking purchased or rented digital content, means for receipting purchased or rented content purchase step, for purchasing or renting digital content, sequentially coupled to said validation step;

a means to display new content in customer library, means to search and organize all customer content, means to identify content for customer download, means to display remaining duration on rented content, means to present customer with rental terms and conditions, means to check-out content from the customer library, means to check-in content back into the customer library addition step, for managing a customer's library of owned or rented digital content, sequentially coupled to said purchase step;

a retail purchase shopping step, for starting the retail shopping process;

a means to identify a digital content title, means to convey the digital content identity to retail store purchase system purchase content selection step, for selecting a digital content identifier for purchase, sequentially coupled to said retail purchase shopping step;

a purchase check-out step, for beginning the purchase transaction, sequentially coupled to said purchase content selection step;

a means to represent a digital content identifier for said digital content, means to convey the digital content identifier in machine-readable form, means to convey the digital content identifier in human-readable form purchase identifier entry step, for entering the digital content identifier into a retail point-of-sale system, sequentially coupled to said purchase check-out step;

a means to contact an electronic retail portal, means to convey a digital content identifier to a retail portal, means to conduct a purchase transaction via a retail portal purchase authorization step, for transferring a purchase request via an electronic retail portal, selectively coupled to said purchase identifier entry step;

a means to identify a retailer, means to validate said retailer for transactions, means to search digital content inventory for requested digital content, means to generate a unique content identifier for later customer use, means to conduct a credit or electronic banking transaction with retail point-of-sale system retail purchase transaction step, for confirming retailer authorization and generating a unique customer digital content identifier, sequentially coupled to said purchase authorization step;

a means to indicate a successful retail purchase transaction, means to convey the unique customer digital content identifier, means to indicate a retail transaction failure purchase transaction response step, for returning the unique customer digital content identifier to the retail point-of-sale system, sequentially coupled to said retail purchase transaction step;

a means to convey the unique customer digital content identifier to retail customer, means to convey the unique customer digital content identifier in human-readable form content purchase step, for purchasing of the unique customer digital content identifier from retailer, sequentially coupled to said purchase transaction response step;

a means for customer access to available digital content, means for entering the unique customer digital content identifier contact store purchase step, for searching and identifying said purchased digital content, sequentially coupled to said content purchase step;

a means for logging in to a secure transaction web interface, means for validating customer identity, means for validating security identifier, means for starting a secure transaction retail purchase authentication step, for controlling and securing the online digital content store for authorized customers, sequentially coupled to said contact store purchase step;

a means for validating the customer identifier, means for validating the customer identity, means to display customer authorization rejection retail purchase membership step, for confirming a currently registered customer for said online digital content store, selectively coupled to said retail purchase authentication step;

a means for entering the unique customer digital content identifier purchase identifier selection step, for entering the unique customer digital content identifier of the purchased digital content, sequentially coupled to said retail purchase membership step, and selectively coupled to said retail purchase authentication step;

a means to validate the unique customer digital content identifier purchase identifier validation step, for validating the unique customer digital content identifier, sequentially coupled to said purchase identifier selection step;

a means to convey digital content identifier failure to customer, means to track invalid digital content identifier submission purchase identifier rejection step, for notifying the customer of an invalid unique customer digital content identifier, selectively coupled to said purchase identifier validation step;

a means to add purchased digital content to customer library, means to update customer inventory, means to track transaction and retail source retail purchase library step, for adding retail purchased digital content to the customer digital content library, sequentially coupled to said purchase identifier validation step;

a retail rental shopping step, for starting the retail rental shopping process;

a means to identify a digital content title, means to convey that identity to a retail store rental purchase system rental content selection step, for selecting a digital content identifier for retail rental, sequentially coupled to said retail rental shopping step;

a rental check-out step, for beginning the rental purchase transaction, sequentially coupled to said rental content selection step;

a means to represent a digital content identifier, means to convey an identifier in machine-readable form, means to convey an identifier in human-readable form rental identifier entry step, for entering the digital content identifier into a retail rental point-of-sale system, sequentially coupled to said rental check-out step;

a means to contact an electronic retail portal, means to convey a digital content identifier to a retail portal, means to conduct a purchase transaction via a retail portal rental authorization step, for transferring a rental purchase request via an electronic retail portal, selectively coupled to said rental identifier entry step;

a means to identify a retailer, means to validate retailer for transactions, means to search digital content inventory for requested content, means to generate a unique digital content identifier for later customer use, means to conduct a credit or electronic banking transaction with retail point-of-sale system retail rental transaction step, for confirming retailer authorization and generating a unique customer digital content identifier, sequentially coupled to said rental authorization step;

a means to indicate a successful transaction, means to convey unique digital content identifier, means to indicate a transaction failure rental transaction response step, for returning a unique digital content identifier to a retail point-of-sale system, sequentially coupled to said retail rental transaction step;

a means to convey a the unique customer digital content identifier to retail rental customer, means to convey the unique digital content identifier in human-readable form content rental step, for purchasing rental unique customer digital content identifier from retailer, sequentially coupled to said rental transaction response step;

a means for customer access to available rental digital content, means for entering the unique customer digital content identifier contact store rental step, for searching and identifying rental digital content, sequentially coupled to said content rental step;

a means for logging in to a secure transaction web interface, means for validating customer identity, means for validating security identifier, means for starting a secure transaction retail rental authentication step, for controlling and securing the online digital content store for authorized customers, sequentially coupled to said contact store rental step;

a means for checking customer identifier, means for validating customer identity, means to display authorization rejection retail rental membership step, for confirming a currently registered online digital content store customer, selectively coupled to said retail rental authentication step;

a means for entering the unique customer digital content identifier rental identifier selection step, for entering unique customer digital content identifier of rental digital content, sequentially coupled to said retail rental membership step, and selectively coupled to said retail rental authentication step;

a means to validate the digital content identifier rental identifier validation step, for validating the unique customer digital content identifier, sequentially coupled to said rental identifier selection step;

a means to convey identifier failure to customer, means to track invalid identifier submission rental identifier rejection step, for notifying the customer of an invalid identifier, selectively coupled to said rental identifier validation step;

a means to add rented content to customer digital content library, means to validate rental terms and conditions, means to enforce rental terms and conditions, means to update customer inventory, means to track transaction and retail source retail rental library step, for adding retail rental digital content to customer digital content library, sequentially coupled to said rental identifier validation step;

a content use step, for starting the content use process;

a means for storing titles of owned or rented digital content, means for searching digital content titles content search step, for identifying digital content for use, sequentially coupled to said content use step;

a means for identifying downloaded and non-downloaded digital content localizer step, for locating owned or rented digital content, sequentially coupled to said content search step;

a means to log-in to the online digital content store, means to identify digital content for download, means to establish a secure connection to the online store, means to request download request step, for contacting the online digital content store to request download of owned or rented digital content, selectively coupled to said content localizer step;

a means to uniquely identify customer's local device, means to associate unique device to customer identity, means to communicate unique device identifier with the online digital content store encryption software application, means to arbitrate a cryptographic key and algorithm based on device unique identifier, means to encrypt the requested content with said key and algorithm key generation step, for arbitrating a unique encryption key and encrypting the digital content corresponding to said key, sequentially coupled to said download request step;

a means to download digital content from the online digital content store to the local device, means to establish a secure connection to said digital online content store for download step, for downloading the digital content, sequentially coupled to said key generation step;

a means to store digital content on the local device, means to identify the digital content for later retrieval, means to store cryptographic key data for use in decryption of the digital content local storage step, for storing the digital content on the local device, sequentially coupled to said download step;

a means to verify digital integrity of the digital content, means to identify and said digital content enforce usage rights terms and conditions of said digital content, means to verify the cryptographic key and cryptographic validity content validity step, for validating usage rights of the digital content, sequentially coupled to said local storage step, and selectively coupled to said content localizer step;

a means to experience the digital content, means to interface to a digital content player, means to decrypt the digital content, means to prevent unauthorized access to decrypted digital image of said digital content experience step, for decrypting the content and streaming it to a content player, sequentially coupled to said content validity step;

a means to interface with the local user, means to enable the user to determine local storage, means to enable the user to check-in the digital content to their digital online store library local content storage step, for managing local storage of digital content, sequentially coupled to said content experience step;

a means to contact the digital online content store, means to establish a secure connection with the digital online content store, means to identify digital content stored locally, means to check-in local digital content, means to display customer library of available, checked-in, and checked-out digital content, means to display newly checked-in digital content as available for check-out, means to show locally stored digital content as checked-out content check-in step, for checking in digital content from the local device storage back into the customer content library of said online digital content store, selectively coupled to said local content storage step;

a means to delete local copy of digital content upon library check-in checked-in content deletion step, for deleting checked-in digital content from a local device, sequentially coupled to said content check-in step; and a local content step, for maintaining downloaded content within storage on the local device, selectively coupled to said local content storage step.

\* \* \* \* \*